(12) United States Patent
Nickolls et al.

(10) Patent No.: US 8,321,849 B2
(45) Date of Patent: Nov. 27, 2012

(54) VIRTUAL ARCHITECTURE AND INSTRUCTION SET FOR PARALLEL THREAD COMPUTING

(75) Inventors: John R. Nickolls, Los Altos, CA (US); Henry P. Moreton, Woodside, CA (US); Lars S. Nyland, Carrboro, NC (US); Ian A. Buck, San Jose, CA (US); Richard C. Johnson, Cary, NC (US); Robert S. Glanville, Cupertino, CA (US); Jayant B. Kolhe, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1646 days.

(21) Appl. No.: 11/627,892

(22) Filed: Jan. 26, 2007

(65) Prior Publication Data

US 2008/0184211 A1    Jul. 31, 2008

(51) Int. Cl.
*G06F 9/45*    (2006.01)
(52) U.S. Cl. ...................................... 717/146
(58) Field of Classification Search .................... 717/146
See application file for complete search history.

(56) References Cited

U.S. PATENT DOCUMENTS

| | | | |
|---|---|---|---|
| 5,606,657 A | | 2/1997 | Dennison et al. |
| 5,692,193 A | * | 11/1997 | Jagannathan et al. ........ 718/106 |
| 5,828,880 A | | 10/1998 | Hanko |
| 5,991,794 A | | 11/1999 | Hodges et al. |
| 6,113,650 A | * | 9/2000 | Sakai ............................ 717/160 |
| 6,779,049 B2 | | 8/2004 | Altman et al. |
| 6,839,828 B2 | | 1/2005 | Gschwind |
| 6,897,871 B1 | | 5/2005 | Morein et al. |
| 7,234,139 B1 | * | 6/2007 | Feinberg ............................ 718/1 |
| 7,275,249 B1 | * | 9/2007 | Miller et al. ................... 718/105 |
| 7,861,060 B1 | | 12/2010 | Nickolls et al. |
| 8,010,953 B2 | * | 8/2011 | Gschwind ...................... 717/149 |
| 2004/0098709 A1 | * | 5/2004 | Kyo .............................. 717/140 |
| 2005/0120194 A1 | | 6/2005 | Kissell |
| 2006/0150165 A1 | * | 7/2006 | Hooper et al. ................ 717/140 |

FOREIGN PATENT DOCUMENTS

GB    2336919 A    3/1999

(Continued)

OTHER PUBLICATIONS

Friesen, J., Java 101: Understanding Java Threads, Parts 1-4, JavaWorld (2002).*

(Continued)

*Primary Examiner* — Wei Zhen
*Assistant Examiner* — Kevin Dothager
(74) *Attorney, Agent, or Firm* — Kilpatrick, Townsend & Stockton LLP

(57) ABSTRACT

A virtual architecture and instruction set support explicit parallel-thread computing. The virtual architecture defines a virtual processor that supports concurrent execution of multiple virtual threads with multiple levels of data sharing and coordination (e.g., synchronization) between different virtual threads, as well as a virtual execution driver that controls the virtual processor. A virtual instruction set architecture for the virtual processor is used to define behavior of a virtual thread and includes instructions related to parallel thread behavior, e.g., data sharing and synchronization. Using the virtual platform, programmers can develop application programs in which virtual threads execute concurrently to process data; virtual translators and drivers adapt the application code to particular hardware on which it is to execute, transparently to the programmer.

23 Claims, 10 Drawing Sheets

FOREIGN PATENT DOCUMENTS

WO  WO 00/10081 A2  2/2000

OTHER PUBLICATIONS

Flanagan, D., Java in a Nutshell, 5th Edition, O'Reilly Media (2005).*

Velocity Reviews, Java Threads (2005).*

Labonte, F., et al., The Stream Virtual Machine (2004).*

Introduction to the Auto-Partitioning Programming Model; 2003, *Intel White Paper*, 10 pages.

Cell Microprocessor, downloaed at en.wikipedia.org/wiki/Cell_microprocessor.

Cell Architecture Explained Version 2, Introduction and Index, downloaded at http://www.blachford.info/computer/Cell/Cell0_v2.html on Feb. 7, 2007.

Eggers et al. "Simultaneous multithreading: A platform for next-generation processors" IEEE Micro, Sep./Oct. 1997(vol. 17, No. 5) pp. 12-19.

Gschwind et al. "Synergistic Processing in Cell's Multicore Architecture", IEEE Computer Society, vol. 26, Issue 2 (Mar. 2006) pp. 10-24.

Marr et al., "Hyper-Threading Technology Architecture and Microarchitecture," Intel Technology Journal, vol. 06 Issue 01 Published Feb. 14, 2002.

Search and Examination Report, Austrian Patent Office, dated Sep. 22, 2009, 12 pages.

Supercomputing '06 Workshop "General-Purpose GPU Computing: Practice and Experience", Nov. 13, 2006.

* cited by examiner

| NAME | DESCRIPTION |
|---|---|
| %ntid.x, %ntid.y, %ntid.z | CTA dimensions |
| %tid.x, %tid.y, %tid.z | Thread ID within a CTA |
| %nctaid.x, %nctaid.y, %nctaid.z | Grid dimensions |
| %ctaid.x, %ctaid.y, %ctaid.z | CTA ID within a grid |
| %gridid | Grid ID |

FIG. 5

| TYPE | DESCRIPTION | ALLOWED <n> |
|---|---|---|
| .b<n> | Untyped variable | 1, 8, 16, 32, 64 |
| .s<n> | Signed integer | 8, 16, 32, 64 |
| .u<n> | Unsigned integer | 8, 16, 32, 64 |
| .f<n> | Floating-point number | 16, 32, 64 |

FIG. 6

| NAME | SHARING | DESCRIPTION | MAPS TO |
|---|---|---|---|
| .reg | Thread | Operand register | Local registers |
| .sreg | Thread | Special registers (see Fig. 5) | Local registers |
| .local | Thread | Per-thread unshared memory | Global memory |
| .shared | CTA | Shared memory, read/write access | Shared memory |
| .param | CTA | Shared value with read-only access | Param. or shared memory |
| .const | Grid | Shared value with read-only access | Param. memory |
| .global | context | Value shared across CTAs | Global memory |
| .tex | context | Texture shared across CTAs | Global memory |
| .surf | context | Surface shared across CTAs | Global memory |

FIG. 7

| INSTRUCTION | EFFECT |
|---|---|
| add.<type> d, a, b | d = a+b |
| sub.<type> d, a, b | d = a-b |
| mul.<type> d, a, b | d = a*b |
| div.<type> d, a, b | d = a/b |
| mad.<type> d, a, b, c | d = [a*b] + c |
| fma.<type> d, a, b, c | d = a*b + c |
| sad.<type> d, a, b, c | d = \|a-b\| + c |
| rem.<type> d, a, b | d = a mod b |
| abs.<type> d, a | d = \|a\| |
| neg.<type> d, a | d = -a |
| min.<type> d, a, b | d = min(a,b) |
| max.<type> d, a, b | d = max(a,b) |
| frc.<type> d, a | d = a - floor(a) |
| sin.<type> d, a | d = sin a |
| cos.<type> d, a | d = cos a |
| atan2.<type> d, a, b | d = $\tan^{-1}$ (a/b) |
| lg2.<type> d, a | d = $\log_2$ a |
| ex2.<type> d, a | d = $2^a$ |
| rcp.<type> d, a | d = 1/a |
| sqrt.<type> d, a | d = sqrt(a) |
| rsqrt.<type> d, a | d = 1/sqrt(a) |

*FIG. 8A*

| INSTRUCTION | EFFECT |
|---|---|
| dot.<type> d, a, b | d = sum(a[i]*b[i]) |
| cross.<type> d, a, b | d = a X b |
| mag.<type> d, a | d = sqrt(sum(a[i]*a[i])) |
| vred.<op>.<type> d, a | d = a[0];<br>for i = 1 to length {<br>    d = <op>(d, a[i])<br>} |

*FIG. 8B*

| INSTRUCTION | EFFECT |
|---|---|
| sel.<type> d, a, b, c | d = c ? a : b |
| set.<cmp>.<type> d, a, b | t = a <cmp> b;<br>d = t ? ~0 : 0 |
| setb.<cmp>.<bop>.<type> d, a, b, c | t = a <cmp> b;<br>d = (t <bop> c) ? ~0 : 0 |
| setp.<cmp>.<bop>.<type> d1 \| d2, a, b, c | t = a <cmp> b;<br>d1 = (t <bop> c)<br>d2 = (!t <bop> c) |

*FIG. 8C*

| INSTRUCTION | EFFECT |
|---|---|
| and.<type> d, a, b | d = a & b |
| or.<type> d, a, b | d = a \| b |
| xor.<type> d, a, b | d = a ^ b |
| not.<type> d, a | d = ~a |
| cnot.<type> d, a | d = !a |
| shl.<type> d, a, b | d = a << b |
| shr.<type> d, a, b | d = a >> b |

*FIG. 8D*

| INSTRUCTION | EFFECT |
|---|---|
| cvt.<dtype>.<atype> d, a | d = (dtype) a |
| cvt.<mode>.<dtype>.<atype> d, a | d = (dtype) a,<br>rounded per <mode> |

*FIG. 8E*

| INSTRUCTION | EFFECT |
| --- | --- |
| mov.<type> d, a | d = a |
| ld.<space>.<type> d, <src> | Load register d with data identified by <src> |
| st.<space>.<type> <dst>, a | Store data in register a to location identified by <dst> |
| tex d, [t, x, y] | d = texture(t,x,y) |
| suld d, [s, x, y] | d = surface(s,x,y) |
| sust [s, x, y], a | surface(s,x,y) = a |

FIG. 8F  850

| INSTRUCTION | EFFECT |
| --- | --- |
| bra <target> | go to <target> |
| call <rv> fname <args> | Function/subroutine call |
| ret | Return from function/subroutine |
| exit | Terminate thread |
| trap | Invoke processor trap routine |
| brkpt | Suspend execution |
| nop | No operation |

FIG. 8G  860

| INSTRUCTION | EFFECT |
| --- | --- |
| bar | Wait at barrier for all other threads of CTA |
| Membar <space> | Wait for memory writes to complete |
| atom.<space>.<op>.<type> d, <ref>, b, c | Atomically read, update, and write back to a shared memory variable |
| vote.<op> d, a | Set d for each thread in a group based on a being true or false across threads |

FIG. 8H  870

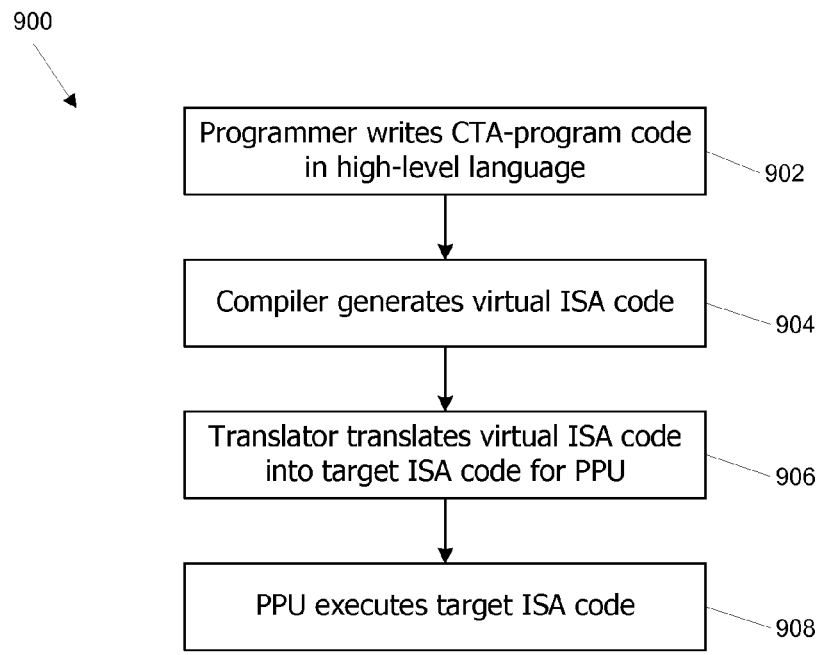

FIG. 9

| FUNCTION | PARAMETERS |
|---|---|
| initCTA | cname, ntid.x, ntid.y, ntid.z |
| setCTAProgram | cname, pname |
| setCTAInputArray | cname, baseAddr, size |
| setCTAOutputArray | cname, baseAddr, size |
| setCTAParams | cname, np,<list> |
| initGrid | gname, cname, nctaid.x, nctaid.y, nctaid.z |
| setGridInputArray | gname, baseAddr, size |
| setGridOutputArray | gname, baseAddr, size |
| setGridParams | gname, np,<list> |
| launchCTA | cname |
| launchGrid | gname |

FIG. 10

VIRTUAL ARCHITECTURE AND INSTRUCTION SET FOR PARALLEL THREAD COMPUTING

BACKGROUND OF THE INVENTION

The present invention relates in general to parallel processing and in particular to a virtual architecture and instruction set for parallel thread computing.

In parallel processing, multiple processing units (e.g., multiple processor chips or multiple processing cores within a single chip) operate at the same time to process data. Such systems can be used to solve problems that lend themselves to decomposition into multiple parts. One example is image filtering, in which each pixel of an output image (or images) is computed from some number of pixels of an input image (or images). The computation of each output pixel is generally independent of all others, so different processing units can compute different output pixels in parallel. Many other types of problems are also amenable to parallel decomposition. In general, N-way parallel execution can speed up the solution to such problems by roughly a factor of N.

Another class of problems is amenable to parallel processing if the parallel threads of execution can be coordinated with each other. An example is the Fast Fourier Transform (FFT), a recursive algorithm in which, at each stage, a computation is performed on the outputs of a previous stage to generate new values that are used as inputs to the next stage until the output stage is reached. A single thread of execution can perform multiple stages, as long as that thread can reliably obtain the output data from previous stages. If the task is to be divided among multiple threads, some coordination mechanism must be provided so that, e.g., a thread does not attempt to read input data that has not yet been written. (One solution to this problem is described in commonly-assigned, co-pending U.S. patent application Ser. No. 11/303,780, filed Dec. 15, 2005).

Programming parallel processing systems, however, can be difficult. The programmer is usually required to know the number of processing units available and their capabilities (instruction sets, number of data registers, interconnections, etc.) in order to create code that the processing units can actually execute. While machine-specific compilers can provide considerable assistance in this area, it is still necessary to recompile the code each time the code is ported to a different processor.

Moreover, various aspects of parallel processing architectures are evolving rapidly. For example, new platform architectures, instruction sets, and programming models are continually being developed. As various aspects of the parallel architecture (e.g., programming model or instruction set) change from one generation to the next, application programs, software libraries, compilers and other software and tools must also be changed accordingly. This instability can add considerable overhead to development and maintenance of parallel processing code.

When coordination between threads is required, parallel programming becomes more difficult. The programmer must determine what mechanisms are available in a particular processor or computer system to support (or emulate) inter-thread communication and must write code that exploits the available mechanisms. Since the available and/or optimal mechanisms on different computer systems are generally different, parallel code of this kind is generally not portable; it must be rewritten for each hardware platform on which it is to run.

Further, in addition to providing executable code for the processors, the programmer must also provide control code for a "master" processor that coordinates the operations of the various processing units, e.g., instructing each processing unit as to what program to execute and which input data to process. Such control code is usually specific to a particular master processor and inter-processor communication protocol and must usually be rewritten if a different master processor is to be substituted.

The difficulties in compiling and recompiling parallel-processing code can discourage users from upgrading their systems as computing technology evolves. Thus, it would be desirable to decouple compiled parallel processing code from a particular hardware platform and to provide a stable parallel processing architecture and instruction set for parallel applications and tools to target.

BRIEF SUMMARY OF THE INVENTION

Embodiments of the present invention provide a virtual architecture and a virtual instruction set for parallel-thread computing. The virtual parallel architecture defines a virtual processor that supports concurrent execution of multiple virtual threads with multiple levels of data sharing and coordination (e.g., synchronization) between different virtual threads, as well as a virtual execution driver that controls the virtual processor. A virtual instruction set architecture for the virtual processor is used to define behavior of a virtual thread and includes instructions related to parallel thread behavior, e.g., data sharing and synchronization. Using the virtual parallel platform, programmers can develop application programs in which virtual threads execute concurrently to process data. Application programs can be stored and distributed in a highly portable intermediate form, e.g., as program code targeting the virtual parallel platform. At install time or run time, hardware-specific virtual instruction translators and execution drivers adapt the intermediate-form application code to particular hardware on which it is to execute. As a result, application programs are more portable and easier to develop, as the development process is independent of particular processing hardware.

According to one aspect of the present invention, a method for defining a parallel processing operation includes providing first program code defining a sequence of operations to be performed for each of a number of virtual threads in an array of cooperating virtual threads. The first program code is compiled into a virtual thread program that defines a sequence of per-thread instructions to be executed for a representative virtual thread of the array, and the sequence of per-thread instructions includes at least one instruction that defines a cooperative behavior between the representative virtual thread and one or more other virtual threads of the array. The virtual thread program is stored (e.g., in memory or on disk) and can subsequently be translated to a sequence of instructions conforming to a target platform architecture.

In addition, second program code may also be provided to define an array of cooperating virtual threads adapted to process an input data set to generate an output data set, wherein each virtual thread in the array concurrently executes the virtual thread program. The second program code is advantageously converted to a sequence of function calls in a library of virtual functions, where the library includes virtual functions that initialize and cause execution of the array of cooperating virtual threads. This sequence of function calls can also be stored. The stored virtual thread program and the sequence of function calls can then be translated into program code executable on a target platform architecture, where the executable program code defines one or more platform threads that execute the array of cooperating virtual threads. The executable program code can be executed on a computer system conforming to the target platform architecture, thereby generating the output data set, which can be stored in a storage medium (e.g., computer memory, disk, or the like).

As noted, the sequence of per-thread instructions in the virtual thread program code advantageously includes at least one instruction that defines a cooperative behavior between the representative virtual thread and one or more other virtual threads of the array. For example, the sequence of per-thread instructions might include an instruction to suspend execution of operations for the representative virtual thread at a particular point in the sequence until such time as one or more of the other virtual threads reach that particular point, an instruction for the representative virtual thread to store data in a shared memory to which one or more of the other virtual threads have access, an instruction for the representative virtual thread to atomically read and update data stored in a shared memory to which one or more of the other virtual threads have access, or the like.

The virtual thread program may also include a variable definition statement that defines a variable in one of a number of virtual state spaces, wherein different virtual state spaces correspond to different modes of data sharing among the virtual threads. In one embodiment, at least a per-thread unshared mode and a globally shared mode are supported. In other embodiments, additional modes such as a shared mode within one array of virtual threads and/or a shared mode between a plurality of arrays of virtual threads may also be supported.

According to another aspect of the present invention, a method for operating a target processor includes providing input program code. The input program code includes a first portion defining a sequence of operations to be performed for each of a number of virtual threads in an array of virtual threads adapted to process an input data set to generate an output data set and also includes a second portion defining a dimension of the array of virtual threads. The first portion of the input program code is compiled into a virtual thread program defining a sequence of per-thread instructions to be executed for a representative virtual thread of the array. The sequence of per-thread instructions includes at least one instruction that defines a cooperative behavior between the representative virtual thread and one or more other virtual threads of the array. The second portion of the input program code is converted into a sequence of function calls to a virtual function library, where the library includes virtual functions that initialize and cause execution of the array of cooperating virtual threads. The virtual thread program and the sequence of function calls are translated into program code executable on a target platform architecture, where the executable program code defines one or more real threads that execute the array of cooperating virtual threads. The executable program code is executed on a computer system conforming to the target platform architecture, thereby generating the output data set, which can be stored in a storage medium.

In some embodiments, arrays of virtual threads can be defined in two or more dimensions. Further, the second portion of the input program code may also include a function call defining one or more dimensions of a grid of arrays of virtual threads, wherein each array in the grid is to be executed.

Any target platform architecture may be used. In some embodiments, the target platform architecture includes a master processor and a co-processor. During translation, the virtual thread program can be translated into program code executable in parallel by a number of threads defined on the co-processor, while the sequence of function calls is translated into a sequence of calls to a driver program for the co-processor that executes on the master processor. In other embodiments, the target platform architecture includes a central processing unit (CPU). During translation, the virtual thread program and at least a portion of the sequence of function calls are translated into target program code executing the virtual thread array using a number of CPU threads that is less than the number of virtual threads.

According to yet another embodiment of the present invention, a method for operating a target processor includes obtaining a virtual thread program defining a sequence of per-thread instructions to be executed for a representative virtual thread of a number of virtual threads in a virtual thread array adapted to process an input data set to generate an output data set. The sequence of per-thread instructions includes at least one instruction that defines a cooperative behavior between the representative virtual thread and one or more other virtual threads of the array. Additional program code defining dimensions of the virtual thread array is also obtained. The virtual thread program and the additional program code are translated into program code executable on the target platform architecture, where the executable program code defines one or more platform threads that execute the virtual thread array. The executable program code is executed on a computer system conforming to the target platform architecture, thereby generating the output data set and storing the output data set in a memory.

In some embodiments, the virtual thread program may be obtained by receiving source program code written in a high level programming language and compiling the source program code to generate the virtual thread program. Alternatively, the virtual thread program may be read from a storage medium or received from a remote computer system via a network. It is to be understood that virtual thread code that is read or received might have been previously compiled from a high level language or created directly as code conforming to a virtual instruction set architecture.

The following detailed description together with the accompanying drawings will provide a better understanding of the nature and advantages of the present invention.

BRIEF DESCRIPTION OF THE DRAWINGS

FIG. 5 is a table listing special variables defined by a virtual instruction set architecture (ISA) according to an embodiment of the present invention.

FIG. 6 is a table listing variable types supported in a virtual ISA according to an embodiment of the present invention.

FIG. 7 is a table listing virtual state spaces supported in a virtual ISA according to an embodiment of the present invention.

FIGS. 8A-8H are tables listing virtual instructions defined in a virtual ISA according to an embodiment of the present invention.

FIG. 9 is a flow diagram of a process for using a virtual instruction translator according to an embodiment of the present invention.

FIG. 10 is a table listing functions available in a virtual library for a virtual execution driver according to an embodiment of the present invention.

DETAILED DESCRIPTION OF THE INVENTION

Embodiments of the present invention provide a virtual architecture and instruction set for parallel-thread computing. The virtual architecture provides a model of a processor that supports concurrent execution of multiple threads with multiple levels of data sharing and coordination (e.g., synchronization) between different threads, as well as a virtual execution driver that controls the model processor. The virtual instruction set, used to define behavior of a processing thread, includes instructions related to parallel thread behavior, e.g., instructions that allow sharing of data across certain threads and instructions that require different threads to become synchronized at certain programmer-specified points within a program. Using the virtual platform, programmers can develop application programs in which concurrent, cooperating threads are executed to process data. Hardware-specific virtual instruction translators and execution drivers adapt the application code to particular hardware on which it is to execute. As a result, application programs are more portable and easier to develop, as the development process is independent of particular processing hardware.

1. System Overview

Figure 1:
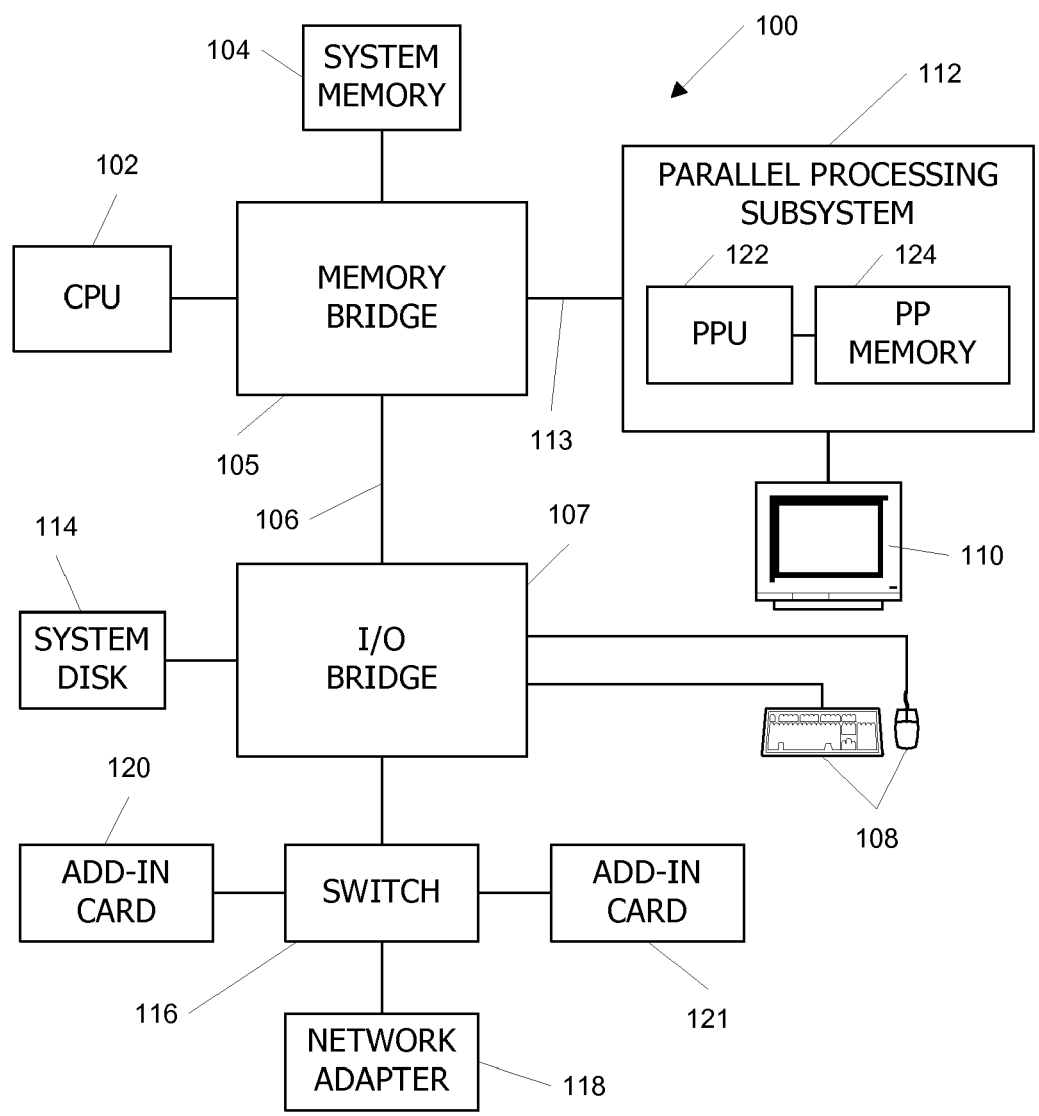
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express or Accelerated Graphics Port link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Parallel processing subsystem 112 includes a parallel processing unit (PPU) 122 and a parallel processing (PP) memory 124, which may be implemented, e.g., using one or more integrated circuit devices such as programmable processors, application specific integrated circuits (ASICs), and memory devices. PPU 122 advantageously implements a highly parallel processor including one or more processing cores, each of which is capable of executing a large number (e.g., hundreds) of threads concurrently. PPU 122 can be programmed to perform a wide array of computations, including linear and nonlinear data transforms, filtering of video and/or audio data, modeling (e.g., applying laws of physics to determine position, velocity and other attributes of objects), image rendering, and so on. PPU 122 may transfer data from system memory 104 and/or PP memory 124 into internal memory, process the data, and write result data back to system memory 104 and/or PP memory 124, where such data can be accessed by other system components, including, e.g., CPU 102. In some embodiments, PPU 122 is a graphics processor that can also be configured to perform various tasks related to generating pixel data from graphics data supplied by CPU 102 and/or system memory 104 via memory bridge 105 and bus 113, interacting with PP memory 124 (which can be used as graphics memory including, e.g., a conventional frame buffer) to store and update pixel data, delivering pixel data to display device 110, and the like. In some embodiments, PP subsystem 112 may include one PPU 122 operating as a graphics processor and another PPU 122 used for general-purpose computations. The PPUs may be identical or different, and each PPU may have its own dedicated PP memory device(s).

CPU 102 operates as the master processor of system 100, controlling and coordinating operations of other system components. In particular, CPU 102 issues commands that control the operation of PPU 122. In some embodiments, CPU 102 writes a stream of commands for PPU 122 to a command buffer, which may be in system memory 104, PP memory 124, or another storage location accessible to both CPU 102 and PPU 122. PPU 122 reads the command stream from the command buffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, PP subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 122 to the rest of system 100 may also be varied. In some embodiments, PP system 112 is implemented as an add-in card that can be inserted into an expansion slot of system 100. In other embodiments, a PPU can be integrated on a single chip with a bus bridge, such as memory bridge 105 or I/O bridge 107. In still other embodiments, some or all elements of PPU 122 may be integrated with CPU 102.

A PPU may be provided with any amount of local PP memory, including no local memory, and may use local memory and system memory in any combination. For instance, PPU 122 can be a graphics processor in a unified memory architecture (UMA) embodiment; in such embodiments, little or no dedicated graphics memory is provided, and PPU 122 would use system memory exclusively or almost exclusively. In UMA embodiments, the PPU may be integrated into a bridge chip or provided as a discrete chip with a high-speed link (e.g., PCI-E) connecting the PPU to the bridge chip and system memory.

It is also to be understood that any number of PPUs may be included in a system, e.g., by including multiple PPUs on a single add-in card, by connecting multiple add-in cards to path 113, and/or by connecting one or more PPUs directly to a system motherboard. Multiple PPUs may be operated in parallel to process data at higher throughput than is possible with a single PPU.

Those skilled in the art will also recognize that a CPU and a PPU can be integrated into a single device, and the CPU and PPU may share various resources such as instruction logic, buffers, caches, memories, processing engines and so on; or separate resources may be provided for parallel processing and other operations. Accordingly, any or all of the circuits and/or functionality described herein as being associated with the PPU could also be implemented in and performed by a suitably equipped CPU.

Systems incorporating PPUs may be implemented in a variety of configurations and form factors, including desktop, laptop, or handheld personal computers, servers, workstations, game consoles, embedded systems, and so on.

Those skilled in the art will also recognize that one advantage of the present invention is increased independence from particular computing hardware. Accordingly, it is to be understood that embodiments of the present invention may be practiced using any computer system, including systems that do not provide a PPU.

2. Virtual Programming Model Overview

In embodiments of the present invention, it is desirable to use PPU 122 or other processor(s) of a computing system to execute general-purpose computations using thread arrays. As used herein, a "thread array" is a group consisting of a number (no) of threads that concurrently execute the same program on an input data set to produce an output data set. Each thread in the thread array is assigned a unique thread identifier ("thread ID") that is accessible to the thread during its execution. The thread ID, which can be defined as a one-dimensional or multi-dimensional numerical value (e.g., 0 to $n_0-1$), controls various aspects of the thread's processing behavior. For instance, a thread ID may be used to determine which portion of the input data set a thread is to process and/or to determine which portion of an output data set a thread is to produce or write.

In some embodiments, the thread arrays are "cooperative" thread arrays, or CTAs. As with other types of thread arrays, a CTA is a group of multiple threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

In some embodiments, threads in a CTA share input data and/or intermediate results with other threads in the same CTA. For example, a CTA program might include an instruction to compute an address in a shared memory to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

CTAs and execution thereof are described in further detail in above-referenced application Ser. No. 11/303,780.

In some situations, it is also useful to define a "grid" of related CTAs (or more generally thread arrays). As used herein, a "grid" of CTAs is a collection of a number ($n_1$) of CTAs in which all CTAs are the same size (i.e., number of threads) and execute the same CTA program. The $n_1$ CTAs within a grid are advantageously independent of each other, meaning that execution of any CTA in the grid is not affected by execution of any other CTA in the grid. As will become apparent, this feature provides significant flexibility in distributing CTAs among available processing cores.

To distinguish different CTAs within a grid, a "CTA identifier" (or CTA ID) is advantageously assigned to each CTA of the grid. As with thread IDs, any unique identifier (including but not limited to numeric identifiers) can be used as a CTA ID. In one embodiment, CTA IDs are simply sequential (one-dimensional) index values from 0 to $n_1-1$. In other embodiments, multidimensional indexing schemes can be used. The CTA ID is common to all threads of a CTA, and a thread of a given CTA within the grid may use its CTA ID in conjunction with its thread ID to determine, e.g., a source location for reading input data and/or a destination location for writing output data. In this manner, threads in different CTAs of the same grid may operate concurrently on the same data set, although in some embodiments sharing of data between different CTAs in a grid is not supported.

Defining a grid of CTAs can be useful, e.g., where it is desired to use multiple CTAs to solve different portions of a single large problem. For instance, it might be desirable to perform a filtering algorithm to generate a high-definition television (HDTV) image. As is known in the art, an HDTV image might include over 2 million pixels. If each thread generates one pixel, the number of threads to be executed would exceed the number of threads that can be processed in a single CTA (assuming a processing platform of reasonable size and cost constructed using conventional techniques).

This large processing task can be managed by dividing the image among multiple CTAs, with each CTA generating a different portion (e.g., a 16×16 tile) of the output pixels. All CTAs execute the same program, and the threads use a combination of the CTA ID and the thread ID to determine locations for reading input data and writing output data, so that each CTA operates on the correct portion of the input data set and writes its portion of the output data set to the correct location.

It should be noted that, unlike threads within a CTA (which can share data), CTAs within a grid advantageously do not share data with or otherwise depend on each other. That is, two CTAs of the same grid can be executed sequentially (in either order) or concurrently and still produce identical results. Consequently, a processing platform (e.g., system 100 of FIG. 1) can execute a grid of CTAs and obtain a result by first executing one CTA, then the next CTA, and so on until all CTAs of the grid have been executed. Alternatively, if sufficient resources are available, a processing platform can execute the same grid and obtain the same result by executing multiple CTAs in parallel.

In some instances, it may be desirable to define multiple ($n_2$) grids of CTAs, where each grid executes a different portion of a data-processing program or task. For example, the data-processing task might be divided into a number of "solution steps," where each solution step is performed by executing a grid of CTAs. As another example, the data processing task might include performing the same or similar operations on a succession of input data sets (e.g., successive frames of video data); a grid of CTAs can be executed for each input data set. The virtual programming model advantageously supports at least these three levels of work definition (i.e., threads, CTAs, and grids of CTAs); additional levels could also be supported if desired.

It will be appreciated that the size (number $n_0$ of threads) of a CTA, size (number $n_1$ of CTAs) of a grid, and number ($n_2$) of grids used to solve a particular problem will depend on parameters of the problem and preferences of the programmer or automated agent that defines the problem decomposition. Thus, in some embodiments, the size of a CTA, the size of a grid, and the number of grids are advantageously defined by a programmer.

Problems that benefit from the CTA approach are usually characterized by the presence of a large number of data elements that can be processed in parallel. In some instances the data elements are output elements, each of which is generated by performing the same algorithm on different (possibly overlapping) portions of an input data set. In other instances, the data elements can be input elements that are each to be processed using the same algorithm.

Such problems can always be decomposed into at least two levels and mapped onto the threads, CTAs, and grids described above. For instance, each grid might represent the result of one solution step in a complex data-processing task. Each grid is advantageously divided into a number of "blocks," each of which can be processed as a single CTA. Each block advantageously contains multiple "elements," i.e., elementary portions of the problem to be solved (e.g., a single input data point or a single output data point). Within the CTA, each thread processes one or more elements.

Figure 2A:
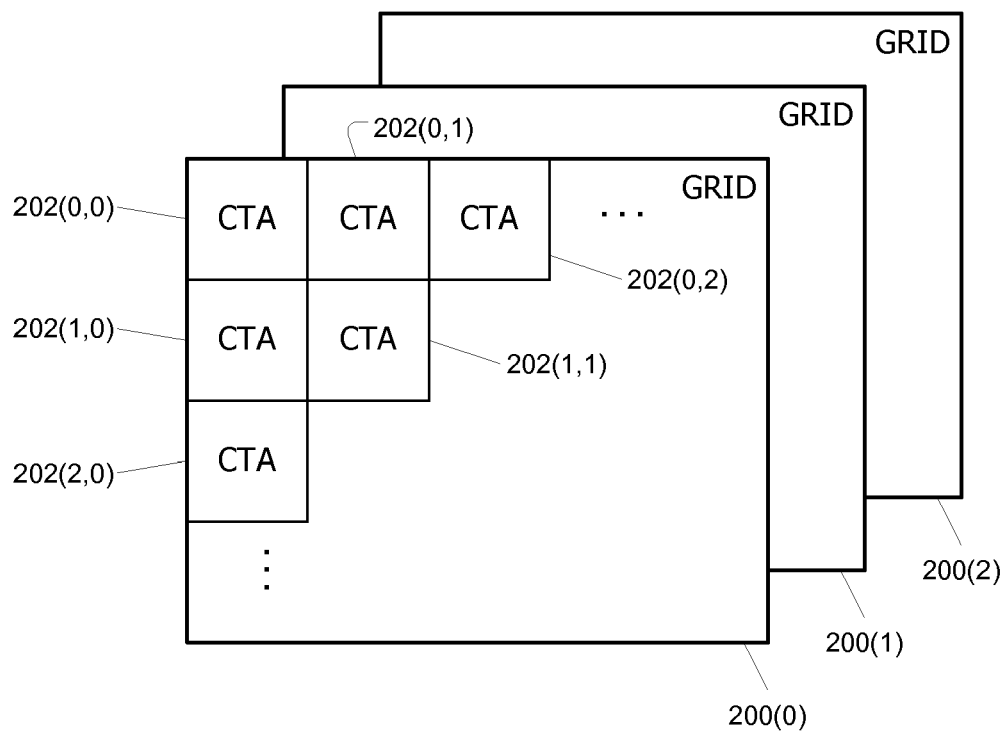
FIGS. 2A and 2B illustrate the relationship between grids, thread arrays, and threads in a programming model used in embodiments of the present invention.
Figure 2B:
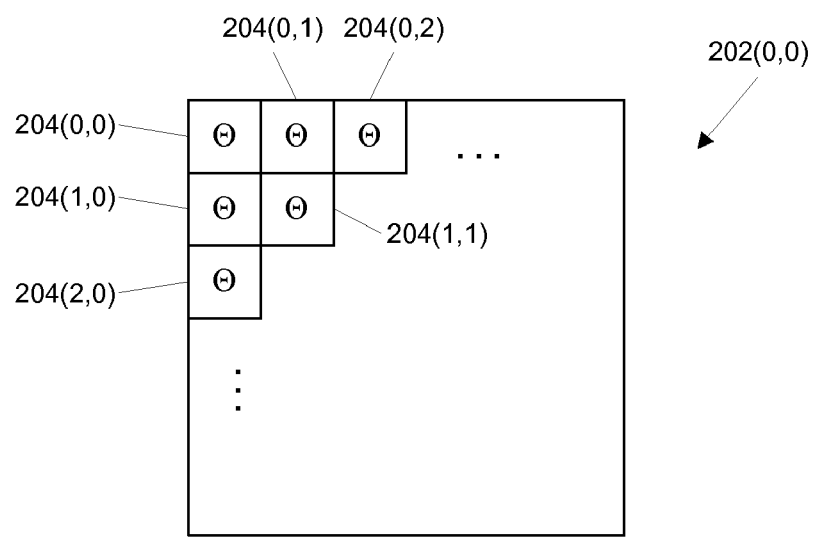

FIGS. 2A and 2B illustrate the relationship between grids, CTAs and threads in a virtual programming model used in embodiments of the present invention. FIG. 2A shows a number of grids 200, with each grid being made up of a two-dimensional (2-D) array of CTAs 202. (Herein, multiple instances of like objects are denoted with reference numbers identifying the object and parenthetical numbers identifying the instance where needed.) As shown in FIG. 2B for CTA 202(0,0), each CTA 202 includes a 2-D array of threads (Θ) 204. For each thread 204 in each CTA 202 of each grid 200, a unique identifier of the form I=[$i_g$, $i_c$, $i_t$] can be defined, where a grid identifier $i_g$ uniquely identifies the grid, a CTA ID $i_c$ uniquely identifies the CTA within the grid, and a thread ID $i_t$ uniquely identifies the thread within the CTA. In this embodiment, the identifier I could be constructed from a one-dimensional grid identifier $i_g$, a two dimensional CTA identifier $i_c$, and a two-dimensional thread identifier $i_t$. In other embodiments, the unique identifier I is a triplet of integers, with $0 \leq i_g < n_2$; $0 \leq i_c < n_1$; and $0 \leq i_t < n_0$. In still other embodiments, any or all of the grid, CTA, and thread identifiers might be expressed as a one-dimensional integer, a 2D coordinate pair, 3D triplet, or the like. The unique thread identifier I can be used, e.g., to determine a source location for input data within an array encompassing an input data set for an entire grid or multiple grids and/or to determine a target location for storing output data within an array encompassing an output data set for an entire grid or multiple grids.

For example, in the case of an HDTV image, each thread 204 might correspond to a pixel of the output image. The size (number of threads 204) of a CTA 202 is a matter of choice in the problem decomposition, limited only by a constraint on the maximum number of threads in a single CTA 202 (which reflects the finite nature of processor resources). A grid 200 could correspond to an entire frame of HDTV data, or multiple grids could be mapped to a single frame.

In some embodiments, the problem decomposition is uniform, meaning that all grids 200 have the same number and arrangement of CTAs 202, and all CTAs 202 have the same number and arrangement of threads 204. In other embodiments, the decomposition can be non-uniform. For instance, different grids might include different numbers of CTAs, and different CTAs (in the same grid or different grids) might include different numbers of threads.

A CTA as defined above can include dozens or even hundreds of concurrent threads. A parallel processing system on which a CTA is to be executed might or might not support such a large number of concurrent threads. In one aspect, the present invention decouples the programmer from such hardware limitations by allowing the programmer to define a processing task using the model of CTAs and grids of CTAs regardless of actual hardware capabilities. For instance, the programmer can write code (a "CTA program") defining the processing task(s) to be performed by a single representative thread of the CTA; defining a CTA as a number of such threads, each with a unique identifier; and defining a grid as a number of CTAs, each with a unique identifier. As described below, such code is automatically translated to code that can be executed on a particular platform. For example, if the CTA is defined as including a number $n_0$ of concurrent threads but the target platform supports only one thread, the translator can define one actual thread that performs the tasks assigned to all of the $n_0$ threads. If the target platform supports more than one but fewer than $n_0$ concurrent threads, the tasks can be divided among the number of available threads as desired.

Accordingly, the programming model of CTAs and grids is to be understood as a virtual model, i.e., a model that is a conceptual aid to the programmer, decoupled from any particular physical realization. The virtual model of CTAs and grids can be realized in a variety of target platforms with varying degrees of hardware support for parallel processing. In particular, the term "CTA thread" as used herein refers to a virtual model of a discrete processing task (possibly cooperating with one or more other processing tasks), and it is to be understood that CTA threads might or might not map one-to-one to threads on the target platform.

III. Virtual Architecture

In accordance with one aspect of the present invention, a virtual parallel architecture for executing CTAs and grids of CTAs is defined. The virtual parallel architecture is a representation of a parallel processor and associated memory spaces that support execution of a large number of concurrent CTA threads that are capable of cooperative behavior such as sharing data and synchronizing with each other at desired times. This virtual parallel architecture can be mapped onto a variety of actual processors and/or processing systems, including, e.g., PPU 122 of system 100 of FIG. 1. The virtual architecture advantageously defines a number of virtual memory spaces that support different levels of data sharing and types of access, as well as a virtual instruction set architecture (ISA) that identifies all of the functions executable by a virtual processor. The virtual architecture also advantageously defines a virtual execution driver that can be used to control CTA execution, e.g., by defining and launching a CTA or grid of CTAs.

Figure 3:
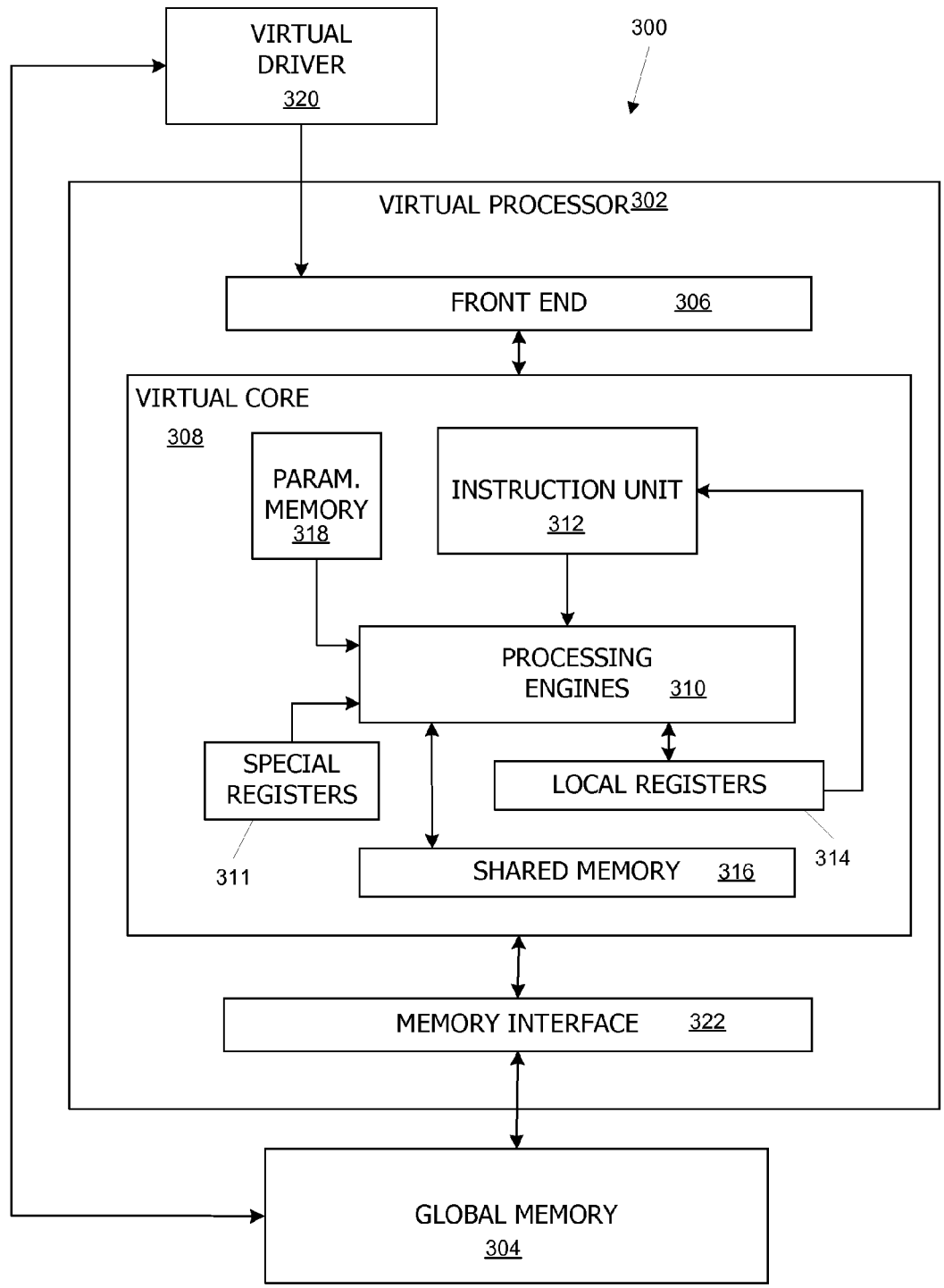
FIG. 3 is a block diagram of a virtual architecture according to an embodiment of the present invention.

FIG. 3 is a block diagram of a virtual architecture 300 according to an embodiment of the present invention. Virtual architecture 300 includes a virtual processor 302 with a virtual core 308 that is configured to execute a large number of CTA threads in parallel. Virtual architecture 300 also includes a global memory 304 that is accessible to virtual processor 302 and a virtual driver 320 that supplies commands to control operation of virtual processor 302. Virtual driver 320 also has access to global memory 304.

Virtual processor 302 includes a front end 306 that receives and interprets commands from virtual driver 320 and an execution core 308 capable of executing all no threads of a single CTA concurrently. Virtual core 308 includes a large number (no or more) of virtual processing engines 310; in one embodiment, each virtual processing engine 310 executes one CTA thread. The virtual processing engines 310 execute their respective CTA threads concurrently, though not necessarily in parallel. In one embodiment, virtual architecture 300 specifies a number T (e.g., 384, 500, 768, etc.) of virtual processing engines 310; this number sets an upper limit on the number $n_0$ of threads in a CTA. It is to be understood that a realization of virtual architecture 300 may include fewer physical processing engines than the specified number T, and a single processing engine can execute several CTA threads, either as a single "real" (i.e., platform-supported) thread or as multiple concurrent real threads.

Virtual processor 302 also includes a virtual instruction unit 312 that keeps virtual processing engines 310 supplied with instructions for their respective CTA threads; the instructions are defined by a virtual ISA that is part of virtual architecture 300. An example of a virtual ISA for parallel thread computing is described below. Instruction unit 312 manages CTA thread synchronization and other cooperative aspects of CTA thread behavior in the course of supplying instructions to virtual processing engines 310.

Virtual core 308 provides internal data storage with different levels of accessibility. Special registers 311 are readable but not writeable by virtual processing engines 310 and are used to store parameters defining each CTA thread's "position" within the problem decomposition model of FIG. 2. In one embodiment, special registers 311 include one register per CTA thread (or per virtual processing engine 310) that stores a thread ID; each thread ID register is accessible only by a respective one of virtual processing engines 310. Special registers 311 may also include additional registers, readable by all CTA threads (or by all virtual processing engines 310) that store a CTA identifier, the CTA dimensions, the dimensions of a grid to which the CTA belongs, and an identifier of a grid to which the CTA belongs. Special registers 311 are written during initialization in response to commands received via front end 306 from virtual driver 320 and do not change during CTA execution.

Local virtual registers 314 are used by each CTA thread as scratch space; each register is allocated for the exclusive use of one CTA thread (or one virtual processing engine 310), and data in any of local registers 314 is accessible only to the CTA thread to which it is allocated. Shared memory 316 is accessible to all CTA threads (within a single CTA); any location in shared memory 316 is accessible to any CTA thread within the same CTA (or to any virtual processing engine 310 within virtual core 308). Parameter memory 318 stores runtime parameters (constants) that can be read but not written by any CTA thread (or any virtual processing engine 310). In one embodiment, virtual driver 320 provides parameters to parameter memory 318 before directing virtual processor 302 to begin execution of a CTA that uses these parameters. Any CTA thread within any CTA (or any virtual processing engine 310 within virtual core 308) can access global memory 304 through a memory interface 322.

In virtual architecture 300, virtual processor 302 is operated as a co-processor under control of virtual driver 320. The virtual architecture specification advantageously includes a virtual application program interface (API) that identifies function calls recognized by virtual driver 320 and the behavior that each function call is expected to produce. Example function calls for a virtual API for parallel thread computing are described below.

Virtual architecture 300 can be realized on a variety of hardware platforms. In one embodiment, virtual architecture 300 is realized in system 100 of FIG. 1, with PPU 122 implementing virtual processor 302 and a PPU driver program executing on CPU 102 implementing virtual driver 320. Global memory 304 can be implemented in system memory 104 and/or PP memory 124.

In one embodiment, PPU 122 includes one or more processing cores that use single-instruction, multiple-data (SIMD) and multithreading techniques to support concurrent execution of a large number (e.g., 384 or 768) of threads from a single instruction unit (implementing virtual instruction unit 312). Each core includes an array of P (e.g., 8, 16, etc.) parallel processing engines 302 configured to receive and execute SIMD instructions from the instruction unit, allowing groups of up to P threads to be processed in parallel. The core is multithreaded, with each processing engine being capable of executing up to some number G (e.g., 24) of thread groups concurrently, e.g., by maintaining current state information associated with each thread such that that the processing engine can switch rapidly from one thread to another. Thus, the core concurrently executes G SIMD groups of P threads each, for a total of P*G concurrent threads. In this realization, as long as $P*G \geq n_0$, there can be a one-to-one correspondence between the (virtual) CTA threads and concurrent threads executing on real PPU 122.

Special registers 311 can be implemented in PPU 122 by providing each processing core with a P*G-entry register file, with each entry capable of storing a thread ID and by providing a set of globally readable registers to store a CTA ID, a grid ID and CTA and grid dimensions. Alternatively, special registers 311 can be implemented using other storage locations.

Local registers 314 can be implemented in PPU 122 as a local register file that is physically or logically divided into P lanes, each having some number of entries (where each entry might store, e.g., a 32-bit word). One lane is assigned to each of the P processing engines, and corresponding entries in different lanes can be populated with data for different threads executing the same program to facilitate SIMD execution. Different portions of the lanes can be allocated to different ones of the G concurrent thread groups, so that a given entry in the local register file is accessible only to a particular thread. In one embodiment, certain entries within the local register file are reserved for storing thread identifiers, implementing one of special registers 311.

Shared memory 316 can be implemented in PPU 122 as a shared register file or shared on-chip cache memory with an interconnect that allows any processing engine to read from or write to any location in the shared memory. Parameter memory 318 can be implemented in PPU 122 as a designated section within the same shared register file or shared cache memory that implements shared memory 316, or as a separate shared register file or on-chip cache memory to which the processing engines have read-only access. In one embodiment, the area that implements the parameter memory is also used to store the CTA ID and grid ID, as well as CTA and grid dimensions, implementing portions of special registers 311.

In one embodiment, a PPU driver program executing on CPU 102 of FIG. 1 responds to virtual API function calls by writing commands to a pushbuffer (not explicitly shown) in memory (e.g., system memory 104), from which the commands are read by PPU 122. The commands advantageously are associated with state parameters such as the number of threads in the CTA, the location in global memory of an input data set to be processed using the CTA, the location in global memory of the CTA program to be executed, and the location in global memory where output data is to be written. In response to the commands and state parameters, PPU 122 loads state parameters into one of its cores, then begins launching threads until the number of threads specified in the CTA parameters have been launched. In one embodiment, PPU 122 includes control logic that assigns thread IDs sequentially to threads as they are launched; the thread ID can be stored, e.g., at a designated location within the local register file or in a special register dedicated to this purpose.

In an alternative embodiment virtual architecture 300 is realized in a single-threaded processing core (e.g., in some CPUs) that executes all CTA threads using fewer than no actual threads; processing tasks that the virtual programming model associates with different CTA threads can be combined into a single thread, e.g., by executing the task (or portion thereof) for one CTA thread, then for the next CTA thread, and so on. Vector execution, SIMD execution, and/or any other forms of parallelism available in the machine can be exploited to execute processing tasks associated with multiple CTA threads in parallel or to execute multiple processing tasks associated with the same CTA thread in parallel. Thus, a CTA can be realized using a single thread, $n_0$ threads, or any other number of threads. As described below, a virtual instruction translator advantageously translates code written to target virtual architecture 300 into instructions specific to a target platform.

It will be appreciated that the virtual architecture described herein is illustrative and that variations and modifications are possible. For instance, in one alternative embodiment, each virtual processing engine may have a dedicated thread-ID register that stores the unique thread ID assigned to its thread rather than using space in local virtual registers for this purpose.

As another example, the virtual architecture may specify more or less detail as to the internal structure of virtual core 308. For instance, it might be specified that virtual core 308 includes P multithreaded virtual processing engines used to execute CTA threads in P-way SIMD groups, with up to G SIMD groups coexisting in core 308 such that P*G determines T (the maximum number of threads in a CTA). Different types of memory and levels of sharing may also be specified.

The virtual architecture may be realized in a variety of computer systems using any combination of hardware and/or software elements to define and control each component. While one realization using hardware components has been described by way of example, it is to be understood that the present invention relates to decoupling programming tasks from a particular hardware realization.

4. Programming the Virtual Architecture

Figure 4:
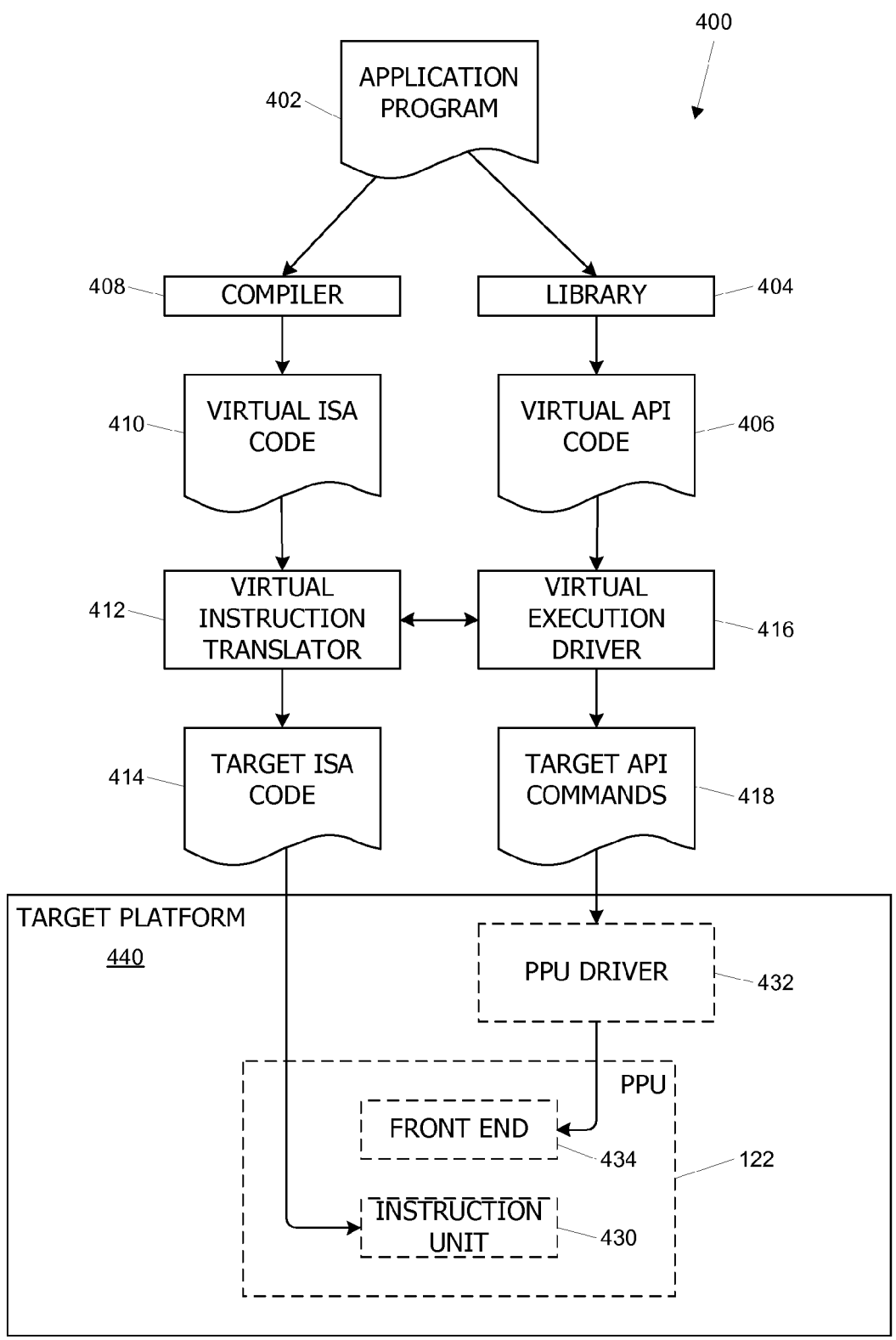
FIG. 4 is a conceptual model of using a virtual architecture to operate a target processor according to an embodiment of the present invention.

FIG. 4 is a conceptual model 400 of using virtual architecture 300 to operate a target processor or platform 440 according to an embodiment of the present invention. As model 400 shows, the existence of virtual architecture 300 decouples compiled applications and APIs from the hardware implementation of the target processor or platform.

An application program 402 defines a data-processing application that makes use of the virtual programming model described above, including single CTAs and/or grids of CTAs. In general, application program 402 includes multiple aspects. First, the program defines the behavior of a single CTA thread. Second, the program defines the dimensions of a CTA (in number of CTA threads) and, if grids are to be used, the dimensions of a grid (in number of CTAs). Third, the program defines an input data set to be processed by the CTA (or grid) and a location at which the output data set is to be stored. Fourth, the program defines an overall processing behavior including, e.g., when to launch each CTA or grid. The program may include additional code that dynamically determines the dimensions of a CTA or grid, whether to keep launching new CTAs or grids, and so on.

Application program 402 may be written in a high-level programming language such as C/C++, FORTRAN, or the like. In one embodiment, an application C/C++ program directly specifies the behavior of one (virtual) CTA thread. In another embodiment, an application program is written using a data-parallel language (e.g., Fortran 90, C* or Data-Parallel C) and specifies data parallel operations on arrays and aggregate data structures; such a program can be compiled into virtual ISA program code that specifies the behavior of one (virtual) CTA thread. To allow the behavior of a CTA thread to be defined, language extensions or a function library may be provided via which the programmer can specify parallel CTA thread behavior. For instance special symbols or variables may be defined to correspond to thread ID, CTA ID, and grid ID, and functions may be provided via which the programmer can indicate when the CTA thread should synchronize with other CTA threads.

When application program 402 is compiled, compiler 408 generates virtual ISA code 410 for those portions of application program 402 that define CTA thread behavior. In one embodiment, virtual ISA code 410 is expressed in the virtual ISA of virtual architecture 300 of FIG. 3. Virtual ISA code

410 is program code, albeit not necessarily code in a form that can be executed on a particular target platform. As such, virtual ISA code 410 can be stored and/or distributed as any other program code. In other embodiments, application programs may be specified wholly or partially as virtual ISA code 410, and compiler 408 may be wholly or partially bypassed.

A virtual instruction translator 412 converts virtual ISA code 410 to target ISA code 414. In some embodiments, target ISA code 414 is code that is directly executable by a target platform 440. For instance, as shown by the dotted boxes in FIG. 4, in one embodiment target ISA code 414 can be received and correctly decoded by an instruction unit 430 in PPU 122. Depending on the specifics of target platform 440, virtual ISA code 410 might be translated into per-thread code to be executed by each of $n_0$ threads on target platform 440. Alternatively, virtual ISA code 410 might be translated into program code to be executed in fewer than $n_0$ threads, with each thread including processing tasks related to more than one of the CTA threads.

In some embodiments, the definition of dimensions of CTAs and/or grids, as well as defining input data sets and output data sets, is handled by a virtual API. Application program 402 may include calls to a library 404 of virtual API functions. In one embodiment, a specification of the virtual API (including, e.g., function names, inputs, outputs and effects but not implementation details) are provided to the programmer and the programmer incorporates virtual API calls directly into application program 402, thereby directly generating virtual API code 406. In another embodiment, virtual API code 406 is generated by compiling an application program 402 that uses some other syntax to define CTAs and grids.

Virtual API code 406 is realized in part by providing a virtual execution driver 416, which translates the virtual API commands of code 406 to target API commands 418 that can be processed by the target platform 440. For instance, as shown by the dotted boxes in FIG. 4, in one embodiment target API commands 418 can be received and processed by a PPU driver 432, which communicates corresponding commands to PPU 122 front end 434. (In this embodiment, virtual execution driver 416 may be an aspect or portion of PPU driver 432.) In another embodiment, the virtual execution driver might not correspond to a driver for a co-processor; it might simply be a control program that launches other programs or threads on the same processor that runs the virtual execution driver.

It is to be understood that a virtual instruction translator 412 and virtual execution driver 416 can be created for any platform or architecture that is capable of supporting CTA execution. To the extent that virtual instruction translators 412 for different platforms or architectures can translate from the same virtual ISA, the same virtual ISA code 410 can be used with any platform or architecture. Thus, application program 402 need not be recompiled for each possible platform or architecture.

Further, it is not necessary that the target platform 440 include a PPU and/or PPU driver as shown in FIG. 4. For instance, in one alternative embodiment, the target platform is a CPU that uses software techniques to emulate concurrent execution of a large number of threads, and the target ISA code and target API commands correspond to instructions in a program (or group of intercommunicating programs) to be executed by the target CPU, which may be, e.g., a single-core or multi-core CPU.

5. Virtual ISA Example

An example of a virtual ISA according to an embodiment of the present invention will now be described. As noted above, the virtual ISA advantageously corresponds to the virtual programming model (CTAs and grids) described above. Accordingly, in this embodiment, virtual ISA code 410 generated by compiler 408 defines the behavior of a single CTA thread to be executed by one of virtual processing engines 310 in virtual core 308 of FIG. 3; the behavior may include cooperative interactions with other CTA threads, such as synchronization and/or data sharing.

It is to be understood that the virtual ISA described herein is solely for purpose of illustration and that the particular elements or combinations of elements described herein are not limiting of the scope of the invention. In some embodiments, a programmer may write code in the virtual ISA; in other embodiments, the programmer writes code in another high-level language (e.g., FORTRAN, C, C++) and compiler 408 generates virtual ISA code. A programmer may also write "mixed" code, with some portions of the code being in a high-level language and other portions written in the virtual ISA.

5.1 Special Variables

FIG. 5 is a table 500 listing "special" variables defined by the example virtual ISA (the "%" prefix is used herein to signal a special variable). These variables relate to the programming model of FIG. 2, in which each thread 204 is identified by its position within a CTA 202, which in turn lies within a particular one of some number of grids 200. In some embodiments, the special variables of table 500 correspond to special registers 311 in virtual architecture 300 of FIG. 3.

In table 500, it is assumed that CTAs and grids are each defined in a three-dimensional space and that different grids are sequentially numbered in a one-dimensional space. The virtual ISA expects that the special variables of FIG. 5 will be initialized when the CTA is launched, and the virtual ISA code can simply use these variables without initialization. Initialization of special variables is discussed below with reference to the virtual API.

As shown in FIG. 5, a first 3-vector of special variables %ntid=(%ntid.x, %ntid.y, %ntid.z) defines the dimensions (in number of threads) of a CTA. All threads of a CTA will share the same %ntid vector. In virtual architecture 300, it is expected that values for the %ntid vector will be provided to virtual processor 302 via a virtual API function call that establishes the dimensions of a CTA as described below.

As shown in FIG. 5, a second 3-vector of special variables %tid=(%tid.x, %tid.y, %tid.z) refers to the thread ID of a given thread within a CTA. In virtual architecture 300 of FIG. 3, it is expected that virtual processor 302 will assign a unique %tid vector satisfying the constraints $0 \leq$ %tid.x$<$%ntid.x, $0 \leq$ %tid.y$<$%ntid.y, and $0 \leq$ %tid.z$<$%ntid.z as each thread of the CTA is launched. In one embodiment, the %tid vector may be defined such that it can be stored in a packed 32-bit word (e.g., 16 bits for %tid.x, 10 bits for %tidy, and 6 bits for %tid.z).

As shown in FIG. 5, a third 3-vector of special variables %nctaid=(%nctaid.x, %nctaid.y, %nctaid.z) defines the dimensions (in number of CTAs) of a grid. In virtual architecture 300 of FIG. 3, it is expected that the values for the %nctaid vector will be provided to virtual processor 302 via a virtual API function call that establishes the dimensions of a grid of CTAs.

As shown in FIG. 5, a fourth 3-vector of special variables %ctaid=(%ctaid.x, %ctaid.y, %ctaid.z) refers to the CTA ID of a given CTA within a grid. In virtual architecture 300 of FIG. 3, it is expected that a unique %ctaid vector satisfying the constraints 0≦% ctaid.x<% nctaid.x, 0≦% ctaid.y<% nctaid.y, and 0≦% ctaid.z<% nctaid.z for the CTA will be provided to virtual processor 302 when the CTA is launched.

The special variables also include a scalar % gridid variable that provides a grid identifier for the grid to which a CTA belongs. In virtual architecture 300 of FIG. 3, it is expected that a % gridid value will be provided to virtual processor 302 to identify the grid of which the current CTA is a part. The % gridid value is advantageously used in virtual ISA code, e.g., when multiple grids are being used to solve different portions of a large problem.

5.2. Program-Defined Variables and Virtual State Spaces

The virtual ISA allows the programmer (or compiler) to define an arbitrary number of variables to represent data items being processed. A variable is defined by a type and a "virtual state space" that indicates how the variable is used and to what extent it is shared. Variables are realized using registers or other memory structures available in a target platform; in many target platforms, the state space may influence the choice of memory structure to be used for realizing a particular variable.

FIG. 6 is a table 600 listing the variable types supported in the example virtual ISA embodiment. Four types are supported: untyped bits, signed integer, unsigned integer, and floating-point. Untyped variables are simply single bits or groups of bits of the specified length. Signed and unsigned integer formats, as well as floating-point formats, may be defined according to conventional formats (e.g., IEEE 754 standards).

In this embodiment, multiple widths are supported for each type, with the parameter <n> being used to specify the width; thus, for instance, .s16 indicates a 16-bit signed integer, .f2 a 32-bit floating-point number and so on. As shown in table 600, some variable types are restricted to certain widths; for instance, floating-point variables must be at least 16 bits, and integer types must be at least 8 bits. A realization of the virtual ISA is expected to support all of the specified widths; if the processor's data paths and/or registers are narrower than the widest width, multiple registers and processor cycles can be used to handle the wider types as is known in the art.

It is to be understood that the data types and widths used herein are illustrative, not restrictive of the invention.

FIG. 7 is a table listing the virtual state spaces supported in the example virtual ISA. Nine state spaces are defined, corresponding to different levels of sharing and possible storage locations in virtual architecture 300 of FIG. 3.

The first three state spaces are shared at the thread level, meaning that each CTA thread will have a separate instance of the variable and no CTA thread will have access to any other CTA thread's instance. The virtual register (.reg) state space is advantageously used to define operands, temporary values, and/or results of computations to be performed by each CTA thread. A program may declare any number of virtual registers. Virtual registers are addressable only by a static compile-time name, not by a computed address. This state space corresponds to local virtual registers 314 in virtual architecture 300 of FIG. 3.

The special-register (.sreg) state space corresponds to the pre-defined special variables of FIG. 5, which are stored in special registers 311 in virtual architecture 300. In some embodiments, the virtual ISA code may not declare any other variables in the .sreg space but may use the special variables as inputs to computations. All CTA threads can read any variable in the .sreg state space. For % tid (or its components), the each CTA thread will read its unique thread identifier; for the other variables in the .sreg state space, all CTA threads in the same CTA will read the same values.

Per-thread local memory (.local) variables correspond to a region of global memory 304 that is allocated and addressed on a per-CTA-thread basis. In other words, when a CTA thread accesses a .local variable, it accesses its own instance of the variable, and changes to a .local variable made in one CTA thread do not affect other CTA threads. Unlike the .reg and .sreg state spaces, per-thread local memory can be addressed using computed addresses.

The next two state spaces define per-CTA variables, meaning that each CTA will have one instance of the variable, which may be accessed by any of its (virtual) threads. Shared (.shared) variables may be read or written by any of the CTA threads. In some embodiments, this state space maps to virtual shared memory 316 of virtual architecture 300 (FIG. 3). In a realization of virtual architecture 300, the .shared state space might map onto an on-chip shared memory implementation (e.g., a shared register file or shared cache memory), while in other realizations, the .shared state space might map onto a per-CTA region of off-chip memory that is allocated and addressed as any other globally accessible memory.

Parameter (.param) variables are read-only and can be read by any (virtual) thread in the CTA. This state space maps to parameter memory 318 of virtual architecture 300 and can be realized, e.g., in an on-chip shared parameter memory or cache memory or in a region of globally accessible off-chip memory that is allocated and addressed as any other globally accessible memory. It is expected that these variables will be initialized in response to driver commands from virtual driver 320.

The constant (.const) state space is used to define per-grid constants that can be read (but not modified) by any (virtual) thread in any CTA in the grid. In virtual architecture 300, the .const state space may be mapped to a region in global memory to which the CTA threads have read-only access. The .const state space can be realized in an on-chip shared parameter memory or cache memory or in a per-grid region of globally accessible off-chip memory that is allocated and addressed as any other globally accessible memory. Like the .param state space, it is expected that variables in the .const state space will be initialized in response to driver commands from virtual driver 320.

The remaining three state spaces define "context" variables, which are accessible to any (virtual) thread in any CTA associated with the application. These state spaces map to global memory 304 in virtual architecture 300. Global (.global) variables can be used for general purposes. In some embodiments, specific state spaces for shared textures (.tex) and surfaces (.surf) may also be defined. These state spaces, which may be useful, e.g., for graphics-related applications, can be used to define and provide access to graphics texture and pixel surface data structures that provide data values corresponding to each pixel of a 2-D (or in some embodiments 3-D) array.

In virtual ISA code 410 of FIG. 4, variables are declared by specifying the state space, type, and a name. The name is a placeholder and may be selected by the programmer or compiler. Thus, for example:

.reg .b32 vr1;

declares an untyped variable of 32 bits in the virtual register state space named vr1. Subsequent lines of virtual ISA code can refer to vr1, e.g., as a source or destination for an operation.

The example virtual ISA also supports arrays and vectors of virtual variables. For example:

.global .f32 resultArray[1000][1000];

declares a virtual globally-accessible 1000-by-1000 array of 32-bit floating-point numbers. Virtual instruction translator 412 may map arrays into addressable memory regions corresponding to the assigned state space.

Vectors in one embodiment can be defined using a vector prefix .v<m>, where m is the number of components of the vector. For example:

.reg .v3 .f32 vpos;

declares a 3-component vector of 32-bit floating point numbers in the per-thread virtual register state space. Once a vector is declared, its components may be identified using suffixes; e.g., vpos.x, vpos.y, vpos.z. In one embodiment, m=2, 3 or 4 are allowed, and suffixes such as (.x, .y, .z, .w), (.0, .1, .2, .3), or (.r, .g, .b, .a) are used to identify components.

Since the variables are virtual, virtual ISA code 410 may define or refer to any number of variables in any of the state spaces (except .sreg, where the variables are predefined). It is possible that the number of variables defined for a particular state space in virtual ISA code 410 may exceed the amount of storage of the corresponding type in a particular hardware implementation. Virtual instruction translator 412 is advantageously configured to include suitable storage management instructions (e.g., moving data between registers and off-chip memory) to make variables available when needed. Virtual instruction translator 412 may also be able to detect cases where a temporary variable is no longer needed and allow its allotted space to be reused by another variable; conventional compiler techniques for allocating registers can be used.

In addition, although the example virtual ISA defines vector variable types, it is not required that the target platform support vector variables. Virtual instruction translator 412 may implement any vector variable as a collection of an appropriate number (e.g., 2, 3 or 4) of scalars.

5.3. Virtual Instructions

FIGS. 8A-8H are tables listing virtual instructions defined in an example virtual ISA. An instruction is defined by its effect, e.g., computing a particular result using one or more operands and placing that result in a destination register, setting a register value, and so on. Most virtual instructions are typed to identify the format of inputs and/or outputs, and aspects of instruction execution may be dependent on the type. The general format of an instruction is:

name. <type> result, operands;

where name is the instruction name; .<type> is a placeholder for any of the types listed in FIG. 6; result is a variable to which the result is stored; and operands are one or more variables that are provided as inputs to the instruction. In one embodiment, virtual architecture 300 is a register-to-register processor, and result and operands for operations other than memory access (FIG. 8F) are required to be variables in the virtual register state space .reg (or the special register state space .sreg in the case of some operands).

A target platform is expected to realize each of the instructions in the virtual ISA. An instruction can be realized either as a corresponding machine instruction that produces the specified effect (referred to herein as "hardware support") or as a sequence of machine instructions that, when executed, produce the specified effect (referred to herein as "software support"). The virtual instruction translator 412 for a particular target platform is advantageously configured to identify the machine instruction or machine instruction sequence corresponding to each virtual instruction.

The following subsections describe the various classes of instructions listed in FIGS. 8A-8H. It is to be understood that the list of instructions presented herein is illustrative and that a virtual ISA may include additional instructions not explicitly described herein and may exclude some or all of the instructions described herein.

5.3.1. Virtual Instructions—Arithmetic

FIG. 8A is a table 800 listing arithmetic operations defined in the example virtual ISA. In this embodiment, the virtual architecture supports only register-to-register arithmetic, and all arithmetic operations manipulate one or more virtual register operands (represented in FIG. 8A as a, b, c) to produce a result (d) that is written to a virtual register. Thus, operands and destinations for arithmetic operations are always in the virtual register state space .reg, except that the special registers of FIG. 5 (in the special register state space .sreg) can be used as operands.

The list of arithmetic operations in table 800 includes the four elementary arithmetic operations: addition (add), subtraction (sub), multiplication (mul) and division (div). These operations can be performed on all integer and floating-point data types and produce a result of the same type as the inputs; in some embodiments, a rounding-mode qualifier may also be added to the instruction to allow the programmer to specify how the result should be rounded and whether, in the case of integer operands, saturation limits should be imposed.

Three compound arithmetic operations with operands a, b and c are also supported: multiply-add (mad), fused multiply-add (fma), and sum of absolute difference (sad). Multiply-add computes the product a*b (with rounding, indicated by brackets) and adds c to the result. Fused multiply add differs from mad in that the product a*b is not rounded prior to adding c. Sum of absolute difference computes the absolute value |a−b|, then adds c.

The remainder (rem) operation is performed only on integer operands and computes the remainder (a mod b) when operand a is divided by operand b. Absolute value (abs) and negation (neg) are unary operations that can be applied to an operand a in a floating-point or signed integer format. Minimum (min) and maximum (max) operations, which can be applied to integer or floating-point operands, set the destination register to the smaller operand or larger operand; handling of special cases in which one or both operands is a non-normal number (e.g., as per IEEE 754 standards) may also be specified.

The remaining operations in table 800 are performed only for floating-point types. Fraction (frc) operation returns the fractional part of its input. Sine (sin), cosine (cos) and arctangent of ratio (atan 2) provide convenient instructions corresponding to trigonometric functions. Base-2 logarithm (lg 2) and exponentiation (ex 2) are also supported. Reciprocal (rep), square root (sqrt), and reciprocal square root (rsqrt) are also supported.

It should be noted that this list of arithmetic operations is illustrative and not limiting of the invention. Other operations or combinations of operations might be supported, including any operations expected to be invoked with sufficient frequency.

In some embodiments, the virtual ISA also defines vector operations. FIG. 8B is a table 810 listing vector operations supported by an example virtual ISA. The vector operations include a dot-product (dot) operation, which computes the scalar dot product d of operand vectors a and b; a cross-product (cross) operation, which computes the vector cross-product d of operand vectors a and b; and a magnitude (mag) operation, which computes the scalar length d of an operand vector a. The vector reduction (vred) operation computes a scalar result d by performing the specified operation <op> iteratively across the elements of the vector operand a. In one embodiment only the reduction operations add, mul, in and max are supported for floating point vectors; for integer vectors, additional reduction operation (e.g., and, or and xor, as described below) may also be supported.

In addition to these operations, other vector operations such as vector addition, vector scaling, and the like (not listed in FIG. 8B) may also be defined in the virtual ISA.

As noted above, some hardware realizations of virtual architecture 300 might not support vector processing. The virtual instruction translator 412 for such realizations is advantageously adapted to generate appropriate sequences of scalar machine instructions to perform these operations; those skilled in the art will be able to determine appropriate sequences.

5.3.2 Virtual Instructions—Selection and Set-Register

FIG. 8C is a table 820 listing selection and set-register operations defined in the example virtual ISA. These operations, which can be performed on any numeric data type, set a destination register based on the outcome of a comparison operation. The elementary selection (sel) operation selects operand a if c is non-zero and operand b if c is zero. Compare and set (set) performs a comparison operation <cmp> on operands a and b to generate a comparison result t, then sets the destination register d to Boolean true (~0) or false (0) based on whether the comparison result t is true (~0) or false (0). The allowed comparison operations <cmp> in one embodiment include equal (t is true if a=b) greater than (t is true if a>b), less than (t is true if a<b), greater-or-equal (t is true if a≧b), less-or-equal (t is true if a≦b), and other comparisons that include, e.g., whether a and/or b are numeric or undefined values.

The setb operation is a variant on compare-and-set that performs a further Boolean operation <bop> between the result t of the comparison operation <cmp> and a third operand c; the result of the Boolean operation t<bop>c determines whether the destination register d is set to Boolean true or false. The allowed Boolean operations <bop> in one embodiment include and, or and xor (see FIG. 8C described below). The setp operation is similar to setb, except that two 1-bit "predicate" destination registers are set: destination register d1 is set to the result of t<bop>c while destination register d2 is set to the result of (!t)<bop>c.

5.3.3. Virtual Instructions—Logic and Bit Manipulation

FIG. 8D is a table 830 listing logical and bit-manipulation operations defined in the example virtual ISA. The bitwise Boolean operations and, or and xor are performed by performing the specified operation on each bit of operands a and b and setting the corresponding bit in register d to the result. The bitwise negation (not) operation inverts each bit of operand a, while the logical negation (cnot) operation sets the destination register to 1 (Boolean true) if a is zero (Boolean false) and to 0 (Boolean false) otherwise.

Bit-shifting is supported by left-shift (shl) and right-shift (shr) operations that shift the bit field in operand a left or right by the number of bits specified by operand b. For signed formats, right-shift advantageously fills leading bits based on the sign bit; for unsigned formats, right-shift fills leading bits with zeroes.

5.3.4. Virtual Instructions—Format Conversion

FIG. 8E is a table 840 listing format conversion operations defined in the example virtual ISA. The format conversion (cvt) instruction converts an operand a of a first type <atype> to an equivalent value in a target type <dtype> and stores the result in destination register d. Valid types in one embodiment are listed in FIG. 6; untyped values (.b<n>) cannot be converted to or from integer or floating-point types. A variant of the format conversion instruction allows the programmer to specify a rounding mode <mode>; handling of numbers that saturate when expressed as the target type may also be specified.

5.3.5. Virtual Instructions—Data Movement and Data Sharing

FIG. 8F is a table 850 listing data movement and data sharing instructions defined in the example virtual ISA. The move (mov) operation sets destination register d to the value of immediate operand a or, if operand a is a register, to the content of register a. The move operation can be restricted to virtual register-type state spaces, e.g., .reg and .sreg in FIG. 7.

The load (ld) instruction loads a value from a source location in memory into destination register d, which in one embodiment must be in the virtual register (.reg) state space. The .<space> qualifier specifies the state space of the source location and can be limited to addressable state spaces in FIG. 7, e.g., spaces other than .reg and .sreg (where the move operation can be used instead). Since virtual architecture 300 in this embodiment is a register-to-register processor, the load instruction is advantageously used to transfer variables from addressable state spaces into the virtual register .reg state space so they can be used as operands.

The specific source location is identified using a source parameter <src> that can be defined in various ways to support different addressing modes. For instance, in some embodiments source parameter <src> may be any one of a named addressable variable whose value is to be stored in d, a reference to a register that holds the source address, a reference to a register that holds an address to be added to an offset value (supplied as an immediate operand), or an immediate absolute address.

Similarly, the store (st) operation stores the value in a source register a to a memory location identified by destination parameter <dst>. The source register a in one embodiment must be in the .reg state space; the destination must be in a writeable and addressable state space (e.g., .local, .global, or .shared in FIG. 7). The destination parameter <dst> can be defined in various ways to support different addressing modes, similarly to the source parameter <src> in the load instruction. The store instruction can be used, e.g., to transfer an operation result from a register to an addressable state space.

In embodiments where texture and surface state spaces are provided, additional virtual instructions may be used to read from the texture memory state space (tex) and to read from (suld) and write to (sust) the surface memory state space. The operands (t, x, y) for a texture read specify the texture identifier (t) and coordinates (x, y); likewise, the operands (s, x, y) for a surface read or write specify the surface identifier (s) and coordinates (x, y).

A CTA thread may cooperate with other CTA threads by sharing data with other CTA threads. For instance, to share data within a CTA, the CTA threads can use load and store virtual instructions (as well as the atomic-update instruction atom described below) to write data to and read data from the per-CTA virtual state spaces. Thus, one CTA thread can write data to the shared state space using a st.shared instruction with a suitably defined destination address; another CTA thread within the same CTA can subsequently read the data by using the same address in a ld.shared instruction. The synchronization instructions (e.g., bar and membar) described below can be used to ensure the proper sequence of data-sharing operations across CTA threads, e.g., that a data-producing CTA thread writes the data before a data-consuming CTA thread reads it. Similarly, st.global and ld.global instructions can be used to cooperate and share data among CTA threads in the same CTA, CTAs in the same grid, and/or different grids in the same application.

5.3.6. Virtual Instructions—Program Control

FIG. 8G is a table 860 listing program control operations provided in the example virtual ISA. These control operations, which will be familiar to those skilled in the art, allow a programmer to redirect program execution. Branch (bra) redirects program flow to a target location <target>. In some embodiments, a branch target is defined by placing an alphanumeric label in front of the target instruction in the virtual ISA code and using that label as the target identifier <target> of a branch instruction. For instance, in one embodiment:

label: add.int32 d, vr1, vr2;

identifies the add instruction as a branch target with label label. The instruction:

bra label;

elsewhere in the code redirects execution to the labeled instruction.

The call and return (ret) instructions supports function and subroutine calls; fname identifies the function or subroutine. (In one embodiment, a "subroutine" is simply a function whose return value is ignored.) The function fname can be declared using a .func directive, and virtual ISA code defining the function may also be provided. Curly braces { } or other grouping symbols can be used to segregate code defining a function or subroutine from other virtual ISA code.

For functions, a parameter list <rv> can be specified to identify where return value(s) should be stored. For both functions and subroutines, input arguments are specified in argument list <args>. When call is executed, the address of the next instruction is stored; when ret is executed, a branch to the stored address is taken.

The exit instruction terminates a CTA thread that encounters it. The trap instruction invokes a processor-defined or user-defined trap routine. The breakpoint (brkpt) instruction suspends execution and is useful, e.g., for debugging purposes. The no-operation (nop) is an instruction that has no effect when executed. It may be used, e.g., to control how soon a next operation may execute.

5.3.7. Virtual Instructions—Parallel Threads

FIG. 8H is a table 870 listing explicitly parallel virtual instructions provided in the example virtual ISA according to an embodiment of the present invention. These instructions support the cooperative thread behavior desired for CTA execution, such as exchanging data among CTA threads.

The barrier (bar) instruction indicates that a CTA thread that reaches it should wait before executing any further instructions until such time as all other CTA threads (in the same CTA) have also reached the same barrier instruction. Any number of barrier instructions can be used in a CTA program. In one embodiment, the barrier instruction requires no parameters (regardless of how many barriers are used) since all CTA threads must reach the nth barrier before any thread can advance to the (n+1)th barrier and so on.

In other embodiments, the barrier instruction may be parameterized, e.g., by specifying a number of CTA threads (or identifiers of particular CTA threads) that should wait at a particular barrier.

Still other embodiments provide both "waiting" and "non-waiting" barrier instructions. At a waiting barrier instruction, the CTA thread waits until the other relevant CTA threads have also reached the barrier; at a non-waiting instruction, the CTA thread indicates that it has arrived but can continue before other CTA threads arrive. At a given barrier, some CTA threads may be waiting while others are non-waiting.

In some embodiments, the bar virtual instruction may be used to synchronize CTA threads that are cooperating or sharing data using shared memory state spaces. For example, suppose that a set of CTA threads (which may include some or all threads of the CTA) each produces some data in a per-thread variable (e.g., an .fp32 virtual register variable myData), then reads the data produced by another CTA thread in the set. The sequence of instructions:

st.shared.fp32 myWriteAddress, myData;
bar;
ld.shared.fp32 myData, myReadAddress;

where myWriteAddress and myReadAddress are per-thread variables corresponding to addresses in the .shared state space, provides the desired behavior. After each CTA thread writes its produced data to the shared memory, it waits until all CTA threads have stored their data, then proceeds to read data (which may have been written by a different CTA thread) from the shared memory.

The memory barrier (membar) instruction indicates that each CTA thread should wait for its previously requested memory operations (or at least all write operations) to complete. This instruction guarantees that a memory access occurring after the membar instruction will see the result of any write operation prior to it. The membar instruction in one embodiment uses an optional state space name <space> to restrict its scope to memory operations targeting the specified state space, which should be a memory state space (e.g., not the .reg or .sreg state spaces). If no state space name is specified, then the CTA thread waits for all pending operations targeting all memory state spaces to complete.

The atomic-update (atom) instruction causes an atomic update (read-modify-write) to a shared variable a that is identified by reference <ref>. The shared variable a can be in any shared state space, and as with other memory references, various addressing modes can be used. For instance, <ref> can be any of a named addressable variable a, a reference to a register that holds the address of the variable a, a reference to a register that holds an address to be added to an offset value (supplied as an immediate operand) to locate the variable a, or an immediate absolute address of variable a. The CTA thread loads the variable a from the shared state space location into a destination register d, then updates the variable a using a specified operation <op> that is performed on operand a and (depending on the operation) second and third operands b, c, with the result being stored back to the location identified by <ref>. The destination register d retains the originally loaded value of a. The load, update, and store operations are performed atomically, guaranteeing that no other CTA thread accesses the variable a while a first CTA thread is executing an atomic update. In one embodiment, variable a is limited to the .global or shared state space and may be specified in the same manner as for the load and store operations described above.

In some embodiments, only certain operations may be performed as atomic updates. For instance, in one embodiment only the following operations <op> may be specified if a is of floating-point type: adding a to b; replacing a with the minimum or maximum of a and b; and a ternary compare-and-swap operation, that replaces a with c if a is equal to b and otherwise leaves a unchanged. For integer a, additional operations may be supported, e.g., bitwise and, or and xor between operands a and b, as well as incrementing or decrementing operand a. Other atomic operations or combinations of operations could also be supported.

The vote instruction performs a reduction operation <op> on a Boolean (e.g., type .b1) operand a across a predefined group of CTA threads. In one embodiment, the virtual architecture specifies that CTA threads are executed in SIMD groups, and the predefined group corresponds to a SIMD group; in other embodiments, other groups of CTA threads may be defined by the virtual architecture or the programmer. The reduction operation <op> entails setting the result value d to a Boolean true or false state based on the reduction of operand a across the CTA threads in the group and the reduction operation specified by the .<op> qualifier. In one embodiment, the allowed reduction operations are: (1) .all, in which d is true if a is true for all CTA threads in the group and false otherwise; (2) .any, in which d is true if a is true for any CTA thread in the group; and (3) .uni, in which d is true if a has the same value (either true or false) for all active CTA threads in the group.

5.3.8. Virtual Instructions—Predicated Execution

In some embodiments, the virtual ISA supports predicated execution of any instruction. In predicated execution, a Boolean "guard predicate" value is associated with the instruction, and the instruction executes only if, at the time of execution, the guard predicate evaluates as true.

In the example virtual ISA, a guard predicate can be any 1-bit Boolean virtual register variable (denoted herein as P). Predicated execution is indicated by placing a predicate guard @P or a not-predicate guard @!P before the opcode of an instruction. A value is established in the predicate register, e.g., by identifying P as the destination register for an instruction that produces a Boolean result, such as the setp instruction in table 820 (FIG. 8C). On encountering the @P or @!P guard predicate, the virtual processor reads the P register. For the @P guard, if P is true, the instruction is executed; if not, it is skipped; for the @!P guard, the instruction is executed if P is false and skipped otherwise. The predicate P is evaluated at execution time for each CTA-thread that encounters the predicated instruction; thus, some CTA threads might execute a predicated instruction while other CTA threads do not.

In some embodiments, predicates can be set as instructions execute. For instance, certain of the virtual instructions in tables 800-870 (FIGS. 8A-8H) may accept a parameter specifying a predicate register as an output; such instructions update the specified predicate register based on some property of the instruction result. For example, a predicate register might be used to indicate whether the result of an arithmetic operation is a special number (e.g., zero, infinity or not-a-number in IEEE 754 floating-point operations), and so on.

6. Virtual Instruction Translator.

As noted above with reference to FIG. 4, virtual instruction translator 412 targets a particular platform architecture. Virtual instruction translator 412, which can be implemented, e.g., as a software program executing on a processor such as CPU 102 of FIG. 1, receives virtual ISA code 410 and translates it into target ISA code 414 that can be executed on the particular platform architecture that virtual instruction translator 412 targets (e.g., by PPU 122 of FIG. 1). Virtual instruction translator 412 maps the virtual variables declared in virtual ISA code 410 onto available storage locations, including processor registers, on-chip memory, off-chip memory and so on. In some embodiments, virtual instruction translator 412 maps each of the virtual state spaces onto a particular type of storage. For instance, the .reg state space can be mapped onto thread-specific data registers, the .shared state space onto sharable memory of the processor, the .global state space onto a region of virtual memory allocated to the application program, and so on. Other mappings are also possible.

The virtual instructions in virtual ISA code 410 are translated to machine instructions. In one embodiment, virtual instruction translator 412 is configured to map each virtual ISA instruction to a corresponding machine instruction or sequence of machine instructions, depending on whether a corresponding machine instruction exists in the instruction set of the processor that will execute the CTA threads.

Virtual instruction translator 412 also maps the CTA threads onto "physical" threads or processes in the target platform architecture. For instance, if the target platform architecture supports at least $n_0$ concurrent threads, each CTA thread can be mapped onto one physical thread, and virtual instruction translator 412 can generate virtual instruction code for a single CTA thread with the expectation that target platform 440 will execute the code for $n_0$ threads with $n_0$ unique identifiers. If the target platform architecture supports fewer than $n_0$ threads, virtual instruction translator 412 can generate virtual ISA code 410 that incorporates instructions corresponding to multiple CTA threads with the expectation that this code will be executed once per CTA, thereby mapping multiple CTA threads to a single physical thread or process.

In particular, virtual instructions related to data sharing (e.g., load store and atomic-update instructions accessing .shared or .global state space) and/or cooperative thread behavior (e.g., barrier, atomic-update and other instructions in FIG. 8H) are translated into machine instructions or sequences of machine instructions. Target platform architectures that are optimized for CTA execution advantageously include hardware-supported barrier instructions, e.g., with counters and/or registers in the instruction unit to count the number of threads that have arrived at the barrier instruction and to set flags preventing further instructions for a thread from being issued while the thread is waiting at a barrier. Other target architectures might not provide direct hardware support for thread synchronization, in which case other inter-thread communication techniques (e.g., semaphores, status arrays in memory, or the like) may be used to create the desired behavior.

Predicated instructions are also translated into machine instructions. In some instances, the target hardware directly supports predicated execution. In other instances, predicates may be stored, e.g., in processor registers, with conditional branch instructions or the like being used to query the registers and create the desired run-time behavior by conditionally branching around predicated instructions.

FIG. 9 is a flow diagram of a process 900 for using a virtual instruction translator according to an embodiment of the present invention. At step 902, a programmer writes CTA program code in a high-level language. In one embodiment, the CTA program code defines the desired behavior of a single CTA thread and may use the thread ID (including CTA ID and/or grid ID) as a parameter to define or control aspects of the CTA thread's behavior. For instance, a shared memory location to be read or written may be determined as a function of thread ID so that different CTA threads in the same CTA will read from and/or write to different memory locations in the shared memory. In one embodiment, CTA program code is included as part of application program code (e.g., program code 402 of FIG. 4). In addition to defining CTA thread behavior, the application program code can also define CTAs and/or grids, set up input and output data sets, etc.

At step 904, a compiler (e.g., compiler 408 of FIG. 4) generates virtual ISA code defining the behavior of a single (virtual) CTA thread from the high-level language code. If the code includes both CTA program code and other code, compiler 408 may separate the CTA program code from the remaining code so that only the CTA program code is used to generate virtual ISA code. Conventional techniques for compiling program code written in one language into another (virtual) language may be used. It should be noted that, since the generated code is in a virtual language, the compiler need not be tied to or optimized for particular hardware. The compiler may optimize the virtual ISA code generated from a particular sequence of input code (e.g., preferring shorter sequences of virtual ISA instructions). Program code in the virtual ISA may be stored in memory on disk and/or distributed to a wide variety of platform architectures, including architectures physically dissimilar to virtual architecture 300 of FIG. 3. Code in the virtual ISA is machine-independent and can be executed on any target platform for which a virtual instruction translator is available. In alternative embodiments, a programmer may write CTA program code directly in the virtual ISA, or virtual ISA code may be automatically generated by a program; if the program code is initially created as virtual ISA code, then compiling step 904 may be omitted.

At step 906, a virtual instruction translator (e.g., translator 412 of FIG. 4) reads the virtual ISA code and generates code in a target ISA that can be executed on a target platform. Unlike the compiler, the virtual instruction translator targets a particular (real) platform architecture and is advantageously configured to adapt and optimize the target ISA code for best performance on that architecture. In one embodiment where the target architecture supports at least $n_0$ threads, the virtual instruction translator generates a target thread program that can be executed concurrently by each of $n_0$ threads to realize a CTA. In another embodiment, the virtual instruction translator generates a target program that uses software techniques (e.g., instruction sequences) to emulate $n_0$ concurrent threads, each executing instructions corresponding to the virtual ISA code. The translator may operate at program installation time, during program initialization, or on a just-in-time basis during program execution.

At step 908, a processor in the target platform (e.g., PPU 122 of FIG. 1) executes the target ISA code to process data. In some embodiments, step 908 may include supplying commands and state parameters to the processor in order to control its behavior, as described further below.

It will be appreciated that process 900 is illustrative and that variations and modifications are possible. Steps described as sequential may be executed in parallel, order of steps may be varied, and steps may be modified or combined. For instance, in some embodiments, a programmer may write CTA program code using the virtual ISA directly, eliminating the need for a compiler that generates virtual ISA code. In other embodiments, the CTA program code is written as part of a larger application program that also includes, e.g., code defining the dimensions of a CTA and/or grid of CTAs to be executed to solve a particular problem. In one embodiment, only those portions of the code that set forth the CTA program are compiled into virtual ISA code; other portions may be compiled into other (real or virtual) instruction sets.

In other embodiments, one virtual instruction translator may be configured to generate multiple versions of the target code adapted for different target platforms. For instance, the translator could produce program code in a high-level language (e.g., C), machine code for a PPU, and/or machine code for a single-core or multi-core CPU that emulates PPU behavior using software techniques.

7. Virtual Execution Driver

In some embodiments, virtual ISA code 410 and virtual instruction translator 412 are used to generate the CTA program code that is to be executed for each thread of a CTA. In terms of the programming model of FIGS. 2A-2B, specifying the CTA program defines a processing task for each CTA thread 204. To complete the model, it is also necessary to define the dimensions of a CTA 202, the number of CTAs in the grid, the input data set to be processed, and so on. Such information is referred to herein as "CTA control information."

As shown in FIG. 4, in some embodiments, the application program 402 specifies CTA control information by using calls to functions in a virtual library 404. In one embodiment, virtual library 404 includes various function calls via which a programmer can define a CTA or a grid of CTAs and indicate when execution should begin.

FIG. 10 is a table 1000 listing functions available in an example virtual library 404. The first group of functions relate to defining a CTA. Specifically, the initCTA function is the first function called to create a new CTA. This function allows the programmer to define the dimensions (ntid.x, ntid.y, ntid.z) of a CTA and to assign an identifier cname to the new CTA. The setCTAProgram function specifies a CTA program to be executed by each thread of the CTA cname; parameter pname is a logical program identifier that corresponds to the desired CTA program (e.g., a program in virtual ISA code). The setCTAInputArray function allows the programmer to specify a source location (starting address and size) in global memory from which the CTA name will read input data, and the setCTAOutputArray function allows the programmer to specify a target location (starting address and size) in global memory to which the CTA cname will write output data. The setCTAParams function is used to set run-time constant parameters for the CTA cname. The programmer provides the list of parameters—e.g., as (name, value) pairs—to the function.

In one embodiment, the setCTAParams function may also be used by compiler 408 when generating virtual ISA code 410. Since the setCTAParams function defines the run-time parameters for the CTA, compiler 408 can interpret this function as defining each parameter as a virtual variable in the .param state space.

Table 1000 also lists functions related to defining grids of CTAs. The initGrid function is the first function called to create a new grid. This function allows the programmer to define the dimensions (nctaid.x, nctaid.y, nctaid.z) of a grid, to identify the CTA cname that will be executed on the grid, and to assign an identifier gname to the newly defined grid. The setGridInputArray and setGridOutputArray functions are similar to the CTA-level functions, allowing a single input and/or output array to be defined for all threads of all CTAs in a grid. The setGridParams function is used to set run-time constant parameters for all CTAs in the grid gname. Compiler 408 can interpret this function as defining each parameter as a virtual variable in the .const state space.

The launchCTA and launchGrid functions signal that execution of the specified CTA cname or grid gname should begin.

The virtual API may also include other functions. For instance, some embodiments provide synchronization functions usable to coordinate the execution of multiple CTAs. For instance, if the output of a first CTA (or grid) is to be used as the input of a second CTA (or grid), the API may include a function (or a parameter for the launch function) via which the virtual execution driver can be instructed that the second CTA (or grid) should not be launched until execution of the first CTA (or grid) is completed.

In accordance with an embodiment of the present invention, any or all of the function calls in table 1000 may be included in an application program that also defines the CTA program (or programs if there are multiple CTAs in the application) to be executed. At compile time, the function calls are treated as calls to an application program interface (API) library 404, thereby generating virtual API code 406.

The virtual API code is realized using a virtual execution driver 418 that implements each function in the virtual library. In one embodiment, virtual execution driver 418 is a driver program executing on CPU 102 of FIG. 1 that controls PPU 122, which realizes the CTA threads. The various function calls in table 1000 of FIG. 10 are implemented such that they result in the driver providing commands via a pushbuffer to PPU 122. In another embodiment, a CPU executes one or more programs to realize a CTA, and virtual execution driver 418 sets up parameters and controls the execution of such programs by the CPU.

It will be appreciated that the virtual API described herein is illustrative and that variations and modifications are possible. Other functions or combinations of functions can be supported. Virtual API techniques known in the art can be adapted for purposes of the present invention.

FURTHER EMBODIMENTS

While the invention has been described with respect to specific embodiments, one skilled in the art will recognize that numerous modifications are possible. For instance, the specific virtual architecture, virtual instructions and virtual API functions described herein are not required; other virtual architectures, instructions and/or functions that support concurrent, cooperative threads could be substituted. Additionally, the embodiments described above may make reference to cases where all blocks have the same number of elements, all CTAs have the same number of threads and execute the same CTA program, and so on. In some applications, e.g., where multiple dependent grids are used, it may be desirable to have CTAs in different grids execute different CTA programs or to have different numbers and/or sizes of grids.

Although reference is made herein to "cooperative thread arrays," it is to be understood that some embodiments may use thread arrays in which data sharing between concurrent threads is not supported; in other embodiments in which such data sharing is supported, the threads defined for a given application might or might not actually share data.

In addition, while embodiments described above may make reference to thread arrays as having multiple threads, it is to be understood that in a "degenerate" case, a thread array might have only one thread. Thus, the present invention could be applied to providing scalability in programs to be executed on a CPU with one or more single-threaded or multi-threaded cores. Using techniques described herein, a program could be written in such a manner that the threads could be distributed across any number of available CPU cores (e.g., using operating-system functionality) without requiring modification or recompilation of the virtual ISA code.

The terms "virtual" and "real" are used herein to reflect the decoupling of a conceptual programming model used by a programmer to describe a problem solution from an actual computer system on which the program ultimately can be executed. The "virtual" programming model and its associated architecture allows a programmer to take a high-level view of a parallel processing task, and it is to be understood that there might or might not be an actual computing system or device whose components map one-to-one to the virtual architecture components described herein. Virtual code, including virtual ISA code and virtual API code, is advantageously realized as code in a language that might or might not correspond one-to-one to the instruction set of any actual processing device. Like all program code, the virtual code referred to herein can be stored in tangible media (e.g., memory or disk), transmitted over a network, and so on.

Computer programs incorporating various features of the present invention—including but not limited to virtual ISA and/or virtual API code, virtual instruction translators, virtual drivers, compilers, virtual function libraries and the like—may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable storage media encoded with the program code may be packaged with a compatible device, or program code may be provided separately from other devices (e.g., via Internet download).

Further, certain actions may be described herein as being taken by a "programmer." It is contemplated that the programmer may be a human being, an automated process that generates program code with little or no human intervention, or any combination of humans interacting with automated or partially automated processes to generate program code.

In addition, while embodiments described herein may make reference to features of particular target platforms, the invention is not limited to these platforms. Indeed, a virtual architecture can be realized in any combination of hardware and/or software components. Those skilled in the art will appreciate that different realizations of the same virtual architecture can be expected to differ in efficiency and/or throughput; such differences, however, are irrelevant to the present invention.

Thus, although the invention has been described with respect to specific embodiments, it will be appreciated that the invention is intended to cover all modifications and equivalents within the scope of the following claims.

What is claimed is:

1. A method for defining a parallel processing operation, the method comprising:
   providing first program code defining a sequence of operations to be performed for each of a plurality of virtual threads in an array of cooperating virtual threads;
   compiling the first program code into a virtual thread program defining a sequence of per-thread instructions to be executed for a representative virtual thread of the plurality of virtual threads, the sequence of per-thread instructions including at least one instruction that defines a cooperative behavior between the representative virtual thread and one or more other virtual threads of the plurality of virtual threads,
   wherein the sequence of per-thread instructions is executable on a virtual parallel architecture that is defined to represent a parallel processor and a plurality of associated memory spaces, the represented parallel processor including a plurality of concurrently operating virtual processing engines, each virtual processing engine being capable of executing one virtual thread of the array of cooperating virtual threads, the number of virtual processing engines being at least as large as the number of virtual threads in the array of cooperating virtual threads,
   the associated memory spaces including a plurality of virtual special registers that are readable but not writeable by the virtual processing engines, the virtual special registers including a plurality of virtual thread-ID registers, each virtual thread-ID register being readable by a different one of the virtual processing engines and usable to store a unique thread identifier for the virtual thread executing on that virtual processing engine, the virtual special registers further including one or more virtual dimension registers to store dimensions of the array of cooperating virtual threads, each of the virtual dimension registers being readable by all of the virtual processing engines; and storing the virtual thread program.

2. The method of claim 1 further comprising:

translating the stored virtual thread program to a sequence of instructions conforming to a target platform architecture.

3. The method of claim 1 further comprising:

providing second program code defining an array of cooperating virtual threads adapted to process an input data set to generate an output data set, wherein each virtual thread in the array concurrently executes the virtual thread program;

converting the second program code to a sequence of function calls in a library of virtual functions, the library including virtual functions that initialize and cause execution of the array of cooperating virtual threads; and storing the sequence of function calls.

4. The method of claim 3 further comprising:

translating the stored virtual thread program and the sequence of function calls into program code executable on a target platform architecture, the executable program code defining one or more platform threads that execute the array of cooperating virtual threads.

5. The method of claim 4 further comprising:

executing the executable program code on a computer system conforming to the target platform architecture, thereby generating the output data set; and storing the output data set in a storage medium.

6. The method of claim 1 wherein the sequence of per-thread instructions includes an instruction to suspend execution of operations for the representative virtual thread at a particular point in the sequence until such time as one or more of the other virtual threads reach that particular point.

7. The method of claim 1 wherein the sequence of per-thread instructions includes an instruction for the representative virtual thread to store data in a shared memory to which one or more of the other virtual threads have access.

8. The method of claim 1 wherein the sequence of per-thread instructions includes an instruction for the representative virtual thread to atomically read and update data stored in a shared memory to which one or more of the other virtual threads have access.

9. The method of claim 1 wherein the virtual thread program includes a variable definition statement that defines a variable in one of a plurality of virtual state spaces, wherein different ones of the plurality of virtual state spaces correspond to different modes of data sharing among the virtual threads.

10. The method of claim 9 wherein the modes of data sharing include a per-thread unshared mode and a globally shared mode.

11. The method of claim 9 wherein the modes of data sharing include a per-thread unshared mode, a shared mode within one array of virtual threads, and a globally shared mode.

12. The method of claim 9 wherein the modes of data sharing include a per-thread unshared mode, a shared mode within one array of virtual threads, a shared mode between a plurality of arrays of virtual threads, and a globally shared mode.

13. A method for operating a target processor, the method comprising:

providing input program code including a first portion defining a sequence of operations to be performed for each of a plurality of virtual threads in an array of virtual threads adapted to process an input data set to generate an output data set, the input program code further including a second portion defining a dimension of the array of virtual threads;

compiling the first portion of the input program code into a virtual thread program defining a sequence of per-thread instructions to be executed for a representative virtual thread of the plurality of virtual threads, the sequence of per-thread instructions including at least one instruction that defines a cooperative behavior between the representative virtual thread and one or more other virtual threads of the plurality of virtual threads, wherein the sequence of per-thread instructions is executable on a virtual parallel architecture that is defined to represent a parallel processor and a plurality of associated memory spaces, the represented parallel processor including a plurality of concurrently operating virtual processing engines, each virtual processing engine being capable of executing one virtual thread of the array of cooperating virtual threads, the number of virtual processing engines being at least as large as the number of virtual threads in the array of cooperating virtual threads, the associated memory spaces including a plurality of virtual special registers that are readable but not writeable by the virtual processing engines, the virtual special registers including a plurality of virtual thread-ID registers, each virtual thread-ID register being readable by a different one of the virtual processing engines and usable to store a unique thread identifier for the virtual thread executing on that virtual processing engine, the virtual special registers further including one or more virtual dimension registers to store dimensions of the array of cooperating virtual threads, each of the virtual dimension registers being readable by all of the virtual processing engines;

converting the second portion of the input program code into a sequence of function calls to a virtual function library, the library including virtual functions that initialize and cause execution of the array of cooperating virtual threads;

translating the virtual thread program and the sequence of function calls into program code executable on a target platform architecture, the executable program code defining one or more real threads that execute the array of cooperating virtual threads;

executing the executable program code on a computer system conforming to the target platform architecture, thereby generating the output data set; and storing the output data set in a storage medium.

14. The method of claim 13 wherein the second portion of the input program code includes program code defining two or more dimensions for the array of virtual threads.

15. The method of claim 14 wherein the second portion of the input program code further includes:

a function call defining one or more dimensions of a grid of arrays of virtual threads, wherein each array in the grid is to be executed.

16. The method of claim 13 wherein the target platform architecture includes a master processor and a co-processor and wherein the act of translating includes:

translating the virtual thread program into program code executable in parallel by a plurality of threads defined on the co-processor; and translating the sequence of function calls into a sequence of calls to a driver program for the co-processor, wherein the driver program executes on the master processor.

17. The method of claim 13 wherein the target platform architecture includes a central processing unit (CPU) and wherein the act of translating includes:

translating the virtual thread program and at least a portion of the sequence of function calls into target program code executing the virtual thread array using a number of CPU threads that is less than the number of virtual threads.

18. A method for operating a target processor, the method comprising:

obtaining a virtual thread program defining a sequence of per-thread instructions to be executed for a representative virtual thread of a plurality of virtual threads in a virtual thread array adapted to process an input data set to generate an output data set, the sequence of per-thread instructions including at least one instruction that defines a cooperative behavior between the representative virtual thread and one or more other virtual threads of the plurality of virtual threads, wherein the sequence of per-thread instructions is executable on a virtual parallel architecture that is defined to represent a parallel processor and a plurality of associated memory spaces, the represented parallel processor including a plurality of concurrently operating virtual processing engines, each virtual processing engine being capable of executing one virtual thread of the array of cooperating virtual threads, the number of virtual processing engines being at least as large as the number of virtual threads in the array of cooperating virtual threads, the associated memory spaces including a plurality of virtual special registers that are readable but not writeable by the virtual processing engines, the virtual special registers including a plurality of virtual thread-ID registers, each virtual thread-ID register being readable by a different one of the virtual processing engines and usable to store a unique thread identifier for the virtual thread executing on that virtual processing engine, the virtual special registers further including one or more virtual dimension registers to store dimensions of the array of cooperating virtual threads, each of the virtual dimension registers being readable by all of the virtual processing engines;

obtaining additional program code defining dimensions of the virtual thread array;

translating the virtual thread program and the additional program code into program code executable on the target platform architecture, the executable program code defining one or more platform threads that execute the virtual thread array;

executing the executable program code on a computer system conforming to the target platform architecture, thereby generating the output data set and storing the output data set in a memory.

19. The method of claim 18 wherein the act of obtaining the virtual thread program includes:

receiving source program code written in a high-level programming language; and compiling the source program code to generate the virtual thread program.

20. The method of claim 18 wherein the act of obtaining the virtual thread program includes:

reading the virtual thread program from a storage medium.

21. The method of claim 18 wherein the act of obtaining the virtual thread program includes:

receiving the virtual thread program from a remote computer system via a network.

22. The method of claim 1 wherein the instruction that defines the cooperative behavior defines the cooperative behavior by reference to the virtual thread-ID register for the representative virtual thread.

23. The method of claim 1 wherein the sequence of per-thread instructions includes at least one instruction to compute a function using the thread identifier stored in the virtual thread-ID register for the representative virtual thread.

* * * * *